United States Patent

Fujikawa et al.

[11] Patent Number: 5,995,178
[45] Date of Patent: Nov. 30, 1999

[54] ACTIVE MATRIX LIQUID CRYSTAL PANEL AND METHOD FOR REPAIRING DEFECT THEREIN

[75] Inventors: Takashi Fujikawa, Tenri; Yoshiharu Kataoka, Suita; Masaya Okamoto, Soraku-gun; Mikio Katayama, Ikoma; Katsumi Irie, Kashihara; Yuzuru Kanemori, Nara; Akihiro Yamamoto, Tenri, all of Japan

[73] Assignee: Sharp Kabushiki Kaisha, Osaka, Japan

[21] Appl. No.: 08/731,551

[22] Filed: Oct. 16, 1996

[30] Foreign Application Priority Data

| Oct. 16, 1995 | [JP] | Japan | 7-267302 |
|---|---|---|---|
| Oct. 30, 1995 | [JP] | Japan | 7-282201 |
| Oct. 30, 1995 | [JP] | Japan | 7-282202 |
| Jun. 18, 1996 | [JP] | Japan | 8-157098 |

[51] Int. Cl.$^6$ .................... G02F 1/136; G02F 1/1343
[52] U.S. Cl. ................ 349/55; 349/138; 349/143; 349/192; 349/39
[58] Field of Search .................... 349/38, 39, 54, 349/55, 41, 42, 122, 138, 139, 143, 147, 192; 345/93

[56] References Cited

U.S. PATENT DOCUMENTS

| 4,688,896 | 8/1987 | Castleberry . |
| 4,857,907 | 8/1989 | Wakai et al. . |
| 5,003,356 | 3/1991 | Wakai et al. . |
| 5,032,883 | 7/1991 | Wakai et al. . |
| 5,086,347 | 2/1992 | Ukai et al. . |
| 5,121,236 | 6/1992 | Ukai et al. . |
| 5,132,819 | 7/1992 | Noriyama et al. ........ 349/38 |

(List continued on next page.)

FOREIGN PATENT DOCUMENTS

| 58-184929 | 10/1983 | Japan . |
| 61-156025 | 7/1986 | Japan . |
| 62-135810 | 6/1987 | Japan . |
| 135351 | 7/1989 | Japan . |
| 4307521 | 10/1992 | Japan . |
| 474714 | 11/1992 | Japan . |
| 6230422 | 8/1994 | Japan . |
| 7-36043 | 2/1995 | Japan . |
| 7-122719 | 12/1995 | Japan . |

OTHER PUBLICATIONS

"Application of a Wide Viewing Angle Technique Essential for a Large–Area Display to Mass Production Panel of TFT Starts", Flat–Panel Display '94, p. 166 1993.
"Mass Production of CMP is Full–Fledged to be Applied to ASIC and DRAM", Nikkei Microdevices, pp. 50–57, 1994.
"Backlight", Flat–Panel Display'94, p. 217, 1993.
Patent Abstracts Of Japan, vol. 017, No. 428 (P–1588), Aug. 9, 1993 & JP–A–05 088199 (Sanyo Electric Co. Ltd.), Apr. 9, 1993.
Patent Abstracts Of Japan, vol. 018, No. 532 (P–1810), Oct. 7, 1994 & JP–A–06 186580 (Seiko Epson Corp.), Jul. 8, 1994.
Fujita et al: "Colorless Polyimide," vol. 29, No. 1 (Jun. 1991), pp. 20–28.

(List continued on next page.)

*Primary Examiner*—William L. Sikes
*Assistant Examiner*—Tai V. Duong
*Attorney, Agent, or Firm*—Nixon & Vandehyw P.C.

[57] ABSTRACT

The active matrix liquid crystal panel of this invention includes: a plurality of scanning lines and a plurality of signal lines arranged to cross each other; a plurality of pixel electrodes arranged in respective regions defined by the plurality of scanning lines and the plurality of signal lines; and a plurality of switching elements for driving the plurality of pixel electrodes, wherein each of the plurality of pixel electrodes overlaps at least one of the adjacent scanning lines and signal lines among the plurality of scanning lines and signal lines via an insulating film, and at least one of the plurality of pixel electrodes is electrically connected with the overlapped line.

11 Claims, 20 Drawing Sheets

U.S. PATENT DOCUMENTS

| | | |
|---|---|---|
| 5,166,085 | 11/1992 | Wakai et al. . |
| 5,335,102 | 8/1994 | Kanemori . |
| 5,434,686 | 7/1995 | Kanemori et al. .......................... 349/55 |
| 5,585,951 | 12/1996 | Noda et al. . |
| 5,600,460 | 2/1997 | Yamamoto et al. ...................... 349/54 |
| 5,641,974 | 6/1997 | den Boer et al. . |
| 5,771,083 | 6/1998 | Fujihara et al. ........................... 349/39 |
| 5,859,683 | 1/1999 | Tagusa et al. ............................. 349/39 |

OTHER PUBLICATIONS

Sakamoto et al: "27.3: A High–Aperture–Ratio 3–in.–Diagonal VGA a–Si Light Valve with Pixel/Data and Pixel/Gate Lines Overlapping," SID 96 Digest, pp. 681–684, 1996.

Kim et al: "4:3: High–Aperture and Failt–Tolerant Pixel Structure for TFT–LCDs," SID 95 Digest, pp. 15–18, 1995.

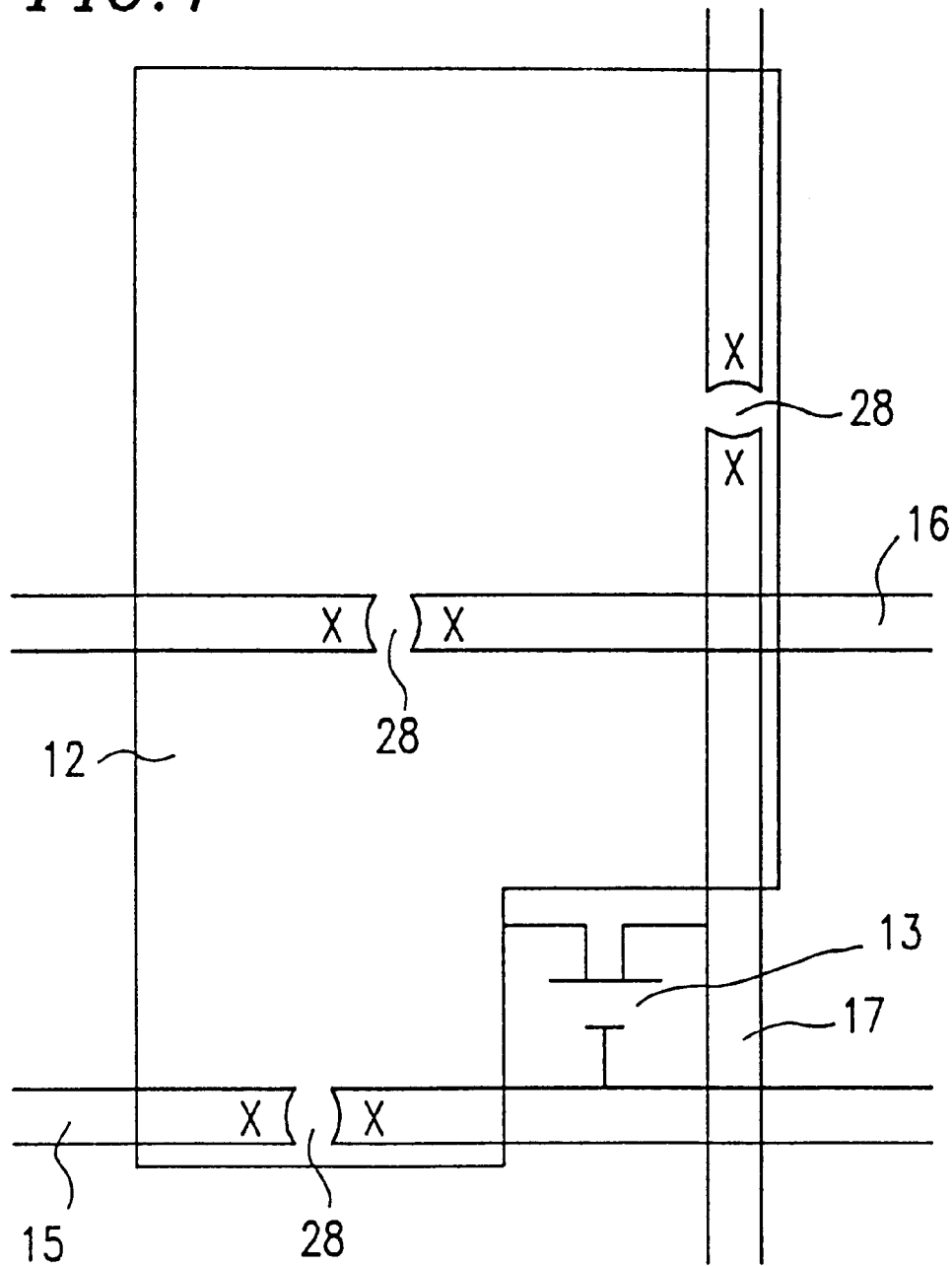

ACTIVE MATRIX LIQUID CRYSTAL PANEL AND METHOD FOR REPAIRING DEFECT THEREIN

RELATED APPLICATION

This application is related to copending application Ser. No. 08/695,632, filed Aug. 12, 1996.

BACKGROUND OF THE INVENTION

1. Field of the Invention

The present invention relates to a liquid crystal panel used as a display device for computers, word processors, and TV sets, and a method for repairing a defect arising in the liquid crystal panel.

2. Description of the Related Art

In recent years, flat display panels using liquid crystal and the like as a display medium has become popular as display devices for computers, word processors, and TV sets. In particular, an active matrix liquid crystal panel having switching elements such as thin film transistors for respective pixels to drive the pixels individually is used as a display device which requires a high resolution such as VGA, S-VGA, and XGA and includes a huge number of pixels for display.

Such an active matrix liquid crystal panel has a pair of substrates sandwiching a liquid crystal layer therebetween. One of the pair of substrates is provided with switching elements (hereinafter, referred to as an active matrix substrate) and includes an insulating substrate, scanning lines and signal lines formed on the insulating substrate to cross each other, switching elements formed in the vicinity of the respective crossings of the scanning lines and the signal lines, and pixel electrodes formed in a matrix and connected to the respective switching elements. The other substrate (hereinafter referred to as a counter substrate) includes a counter electrode.

FIG. 17 is an equivalent circuit diagram of a conventional active matrix substrate. FIG. 18 is a partial enlarged view of FIG. 17.

Referring to FIGS. 17 and 18, the active matrix substrate includes scanning lines 401, scanning line terminals 401a, signal lines 402, signal line terminals 402a, common lines 403, common line terminals 403a, thin film transistors (TFTs) 404, and pixel electrodes 405 which are all formed on a surface of an insulating substrate made of glass, for example. The scanning lines 401 and the signal lines 402 are arranged to cross each other with an insulating film (not shown) therebetween. The TFTs 404 are formed at the respective crossings of the scanning lines 401 and the signal lines 402 as switching elements. A gate electrode 406 and a source electrode 407 of each TFT 404 are connected to the corresponding scanning line 401 and signal line 402, respectively. A drain electrode 408 of each TFT 404 is connected to the corresponding pixel electrode 405.

FIG. 19 is a sectional view of the TFT 404 which is formed on the insulating substrate 420 as described above. The gate electrode 406 which is connected to the scanning line 401 is formed on the insulating substrate 420, and is covered with a gate insulating film 422. A silicon semiconductor layer 423 is formed on the gate insulating film 422, and an etching stopper 424 is formed on the center portion of the silicon semiconductor layer 423 as a channel protection layer. A first n$^+$-Si layer 425 and the second n$^+$-Si layer 426 are formed separately to overlap the etching stopper 424. The first n$^+$-Si layer 425 and a second n$^+$-Si layer 426 are electrically connected to the source electrode 407 and the drain electrode 408, respectively.

The active matrix substrate with the above configuration is laminated together with a counter substrate (not shown), interposing a liquid crystal layer therebetween. A pixel capacitor 411 is then formed between the pixel electrode 405 and a counter electrode of the counter substrate. As shown in FIGS. 17 and 18, the common lines 403 are formed to run in parallel with the scanning lines 401 and cross the signal lines 402 via the gate insulating film 422. All of the common lines 403 are short-circuited via the common line terminals 403a. A storage capacitor 412 is formed between each pixel electrode 405 and the corresponding common line 403.

The scanning lines 401, the signal lines 402, and the common lines 403 may be disconnected due to pinholes generated during the fabrication process and dust and the like attaching to the lines during the fabrication process. When a line is disconnected, a pixel electrode connected to the disconnected line is not supplied with a driving signal, causing display failure. This line disconnection arises with higher probability in a high-precision active matrix liquid crystal panel, since the scanning lines 401 and the signal lines 402 need to be very fine. To repair this display failure due to a disconnection, the conventional active matrix substrate includes redundant lines 409 formed outside the area where the scanning lines 401, the signal lines 402, and the common lines 409 are formed. In FIG. 17, for example, two redundant lines 409 are formed to run in parallel with the scanning lines 401 and cross the signal lines 402 via the gate insulating film 422. Redundant line terminals 409a are formed on the both ends of the redundant lines 409.

In general, in the fabrication process of the liquid crystal panel, the following problems occur. As shown in FIG. 20, when a switching failure 410 or a leakage occurs in one TFT 404, the pixel electrode connected to the TFT 404 is not supplied with a proper driving signal. As a result, the pixel fails in effecting normal display, causing a so-called point defect. Also, as shown in FIG. 21, when a disconnection 430 arises at one signal line 402, all the pixels connected to the signal line 402 fail in effecting normal display, causing a so-called line defect.

The point defect due to the failure 410 in the TFT 404 is generally repaired so that it becomes inconspicuous when the panel is actually driven with drivers mounted thereto to display an image. As a method for repairing a point defect, there is proposed a method of directly connecting the pixel electrode to the corresponding signal line as is disclosed in Japanese Patent Publication No. 7-122719. According to this method, the point defect is repaired using the corresponding TFT 404 in the following manner. The gate electrode of the TFT 404 and the corresponding scanning line 401 are cut apart from each other by irradiating the connecting portion thereof with an energy beam such as a laser beam. Also, the overlap portion of the source electrode and the gate electrode of the TFT 404 and the overlap portion of the gate electrode and the drain electrode of the TFT 404 are irradiated with an energy beam such as a laser beam to penetrate the interposing insulating film at the overlap portions. This allows the source electrode and the gate electrode and the drain electrode and the gate electrode to be electrically connected, thus directly connecting the pixel electrode 405 to the signal line 402.

The above repair method, however, lowers the aperture ratio. The reason is that, in order to facilitate the laser cutting, a laser cut portion 422, which is narrower than the gate electrode 406, needs to be formed between the gate electrode 406 and the scanning line 401 as shown in FIG. 18. This necessitates lengthening the distance between the TFT 404 and the scanning line 401 to some extent, reducing the area of the pixel electrode 405 and thus lowering the aperture ratio.

The line defect due to the disconnection 430 of the signal line 402 is repaired using the corresponding redundant line 409 as described above. First, the crossings of the signal line 402 having the disconnection 430 and the redundant lines 409 via the insulating film (not shown), shown as portions 415 in FIG. 21, are irradiated with a laser beam or the like. This allows the signal line 402 and the redundant lines 409 to be electrically connected. Then, the redundant line terminal 409a on one end of one of the redundant lines 409 is connected to the signal line terminal 402a on one end of the signal line 402 via a jumper line. Thus, the line defect is repaired.

However, the space to be allocated for forming the redundant lines 409 is not large; therefore the number of redundant lines is limited. Accordingly, when a plurality of signal lines 402 are disconnected, the required number of redundant lines 409 becomes small. In such a case, the line defect repair by the above method is difficult.

Referring to FIGS. 22A, 22B, and 23, the POP-structure active matrix substrate will be described.

FIG. 22A is a partial plan view of a conventional POP-structure active matrix liquid crystal panel. FIG. 22B is a sectional view taken along line H–H' of FIG. 22A.

The active matrix substrate includes an insulating substrate 520 on which scanning lines 501 and signal lines 502 are formed to cross each other. A region surrounded by two adjacent scanning lines 501 and two adjacent signal lines 502 constitutes a pixel. FIGS. 22A and 22B illustrate the region corresponding to one pixel.

TFTs 504 are formed in the vicinity of the respective crossings of the scanning lines 501 and the signal lines 502. A gate electrode 530 of each TFT 504 is composed of a branch of the corresponding scanning line 501, while a source electrode 531 of each TFT 504 is composed of a branch of the corresponding signal line 502. A common line 503a is formed to run in parallel with the scanning line 501 and cross the signal line 502 as one of two electrodes forming a storage capacitor.

The scanning line 501 and the common line 503a are covered with an insulating film 513 as shown in FIG. 22B. The signal line 502 and an electrode 503b, as the other electrode forming the storage capacitor, are formed on the insulating film 513. The scanning line 501 and the common line 503 are therefore isolated from the signal line 502 at the respective crossings with the signal line 502. An insulating film 521 is formed on the insulating film 513, covering the signal line 502 and the electrode 503b, and a pixel electrode 505 is formed on the insulating film 521. Contact holes 523 and 526 are formed through the insulating film 521. The pixel electrode 505 is connected to the electrode 503b via the contact hole 523 and to the drain electrode 532 of the TFT 504 via the contact hole 526. An alignment film 516 is formed over the entire surface of the substrate 520 covering the pixel electrode 505.

The counter substrate includes a substrate 522 on which a color filter 518, a counter electrode 517, and an alignment film 516 are formed. The counter substrate and the above-described active matrix substrate are laminated together so that the counter electrode 517 and the pixel electrodes 505 face each other. A liquid crystal material is injected in a space between the counter substrate and the active matrix substrate to form a liquid crystal layer 519. Thus, the POP-structure active matrix liquid crystal panel is fabricated.

In the POP structure, the pixel electrodes 505 overlap the scanning lines 501 and the signal lines 502. This increases the aperture ratio of the resultant liquid crystal panel.

In the POP-structure active matrix liquid crystal panel shown in FIGS. 22A and 22B, a point defect can be repaired by directly connecting the pixel electrode 505 to the signal line 502 as described above.

When a branch of the scanning line 501 is used as the gate electrode of the TFT 504, the aperture ratio decreases by the area shown as a region 528 in FIG. 23. The reason is as follows: If a channel region of the TFT 504 used as a switching element is irradiated with light, the photosensitivity of the TFT 504 affects the display characteristic of the resultant panel. In order to avoid this trouble, a light-shading portion, substantially corresponding to the region 528, is formed on the counter substrate to protect the TFT 504 from being directly irradiated with light. The aperture ratio of the resultant display device is thus decreased. This decrease in the aperture ratio is a critical disadvantage at the present time when an increase in the aperture ratio by even 1% is important.

Moreover, the pixel electrode 505 overlaps the signal line 502 via the thick insulating film 521 as described above. Accordingly, when a short-circuit occurs at a crossing of a signal line 502 and a scanning line 501 or a common line 503a, it is difficult to cut the signal line 502 at two positions located opposite the portion where the short-circuit occurs. Therefore, the above-described method for repairing a line defect is not applicable for the POP-structure liquid crystal panel.

SUMMARY OF THE INVENTION

The active matrix liquid crystal panel of this invention includes: a plurality of scanning lines and a plurality of signal lines arranged to cross each other; a plurality of pixel electrodes arranged in respective regions defined by the plurality of scanning lines and the plurality of signal lines; and a plurality of switching elements for driving the plurality of pixel electrodes, wherein each of the plurality of pixel electrodes overlaps at least one of adjacent scanning lines and adjacent signal lines among the plurality of scanning lines and the plurality of signal lines via an insulating film, and at least one of the plurality of pixel electrodes is electrically connected with the overlapped line.

In one embodiment of the invention, a conductive metal layer is further formed on or under each of the plurality of pixel electrodes.

According to another aspect of the invention, a method for repairing a defect in an active matrix liquid crystal panel is provided. The active matrix liquid crystal panel includes: a plurality of scanning lines and a plurality of signal lines arranged to cross each other; a plurality of pixel electrodes arranged in respective regions defined by the plurality of scanning lines and the plurality of signal lines; and a plurality of switching elements for driving the plurality of pixel electrodes, wherein each of the plurality of pixel electrodes overlaps at least one of the adjacent scanning lines and signal lines among the plurality of scanning lines and signal lines via an insulating layer. The method includes the step of: electrically connecting the over-lapped line and the corresponding pixel electrode when a disconnection arises at the overlapped line by irradiating two positions on the overlapped line which sandwich the disconnection with an energy beam.

In one embodiment, a conductive metal layer is formed on or under each of the plurality of pixel electrodes, and in the step of electrically connecting the overlapped line and the corresponding pixel electrode, the conductive metal layer is melted to connect the line with the disconnection and the corresponding pixel electrode.

Alternatively, the active matrix liquid crystal panel of this invention includes: scanning lines and signal lines arranged to cross each other; a plurality of pixel electrodes arranged in respective regions defined by the scanning lines and the signal lines, wherein each of the pixel electrodes has one or more pads extending therefrom; and switching elements for driving the plurality of pixel electrodes, wherein the scanning lines, the signal lines, and the switching elements are isolated from the pixel electrodes via an insulating film, and each of the pixel electrodes is electrically connected with a drain electrode of the corresponding switching element via a through hole formed through the insulating film, and the one or more pads overlap one adjacent signal line among the signal lines.

Alternatively, the active matrix liquid crystal panel of this invention includes: scanning lines and signal lines arranged to cross each other; a plurality of pixel electrodes arranged in respective regions defined by the scanning lines and the signal lines; and switching elements for driving the respective pixel electrodes, wherein the scanning lines, the signal lines, and the switching elements are isolated from the pixel electrodes via an insulating film, and each of the pixel electrodes is electrically connected with a drain electrode of the corresponding switching element via a through hole formed through the insulating film, and one or more pads are formed under each of the plurality pixel electrodes and extend from the corresponding signal line.

Alternatively, a method for repairing a defect in an active matrix liquid crystal panel of this invention is provided. In the method, when one of the switching elements becomes defective, the one or more pads extending from the pixel electrode corresponding to the defective switching electrode are irradiated with an energy beam to electrically connect the pixel electrode and the corresponding signal line.

Alternatively, a method for repairing a defect in an active matrix liquid crystal panel of this invention is provided. In the method, when one of the switching elements becomes defective, the one or more pads extending from the signal line corresponding to the defective switching electrode are irradiated with an energy beam to electrically connect the signal line and the corresponding pixel electrode.

In one embodiment of the invention, the one or more pads are formed at positions closer to both ends of each of the pixel electrodes.

In another embodiment of the invention, the one or more pads are formed at positions closer to both ends of each of the pixel electrodes.

Alternatively, a method for repairing a defect in an active matrix liquid crystal panel of this invention is provided. In the method, when one of the signal lines has a disconnection, the one or more pads located opposite the signal line disconnection are irradiated with an energy beam to electrically connect the disconnected signal line.

Alternatively, a method for repairing a defect in an active matrix liquid crystal panel of this invention is provided. In the method, when one of the signal lines has a disconnection, the one or more pads located opposite the signal line disconnection are irradiated with an energy beam to electrically connect the disconnected signal line.

In one embodiment of the invention, the thicknesses of a portion of the insulating film where the one or more pads of each of the pixel electrodes overlap the corresponding signal line is more than 2000 Å and less than 5000 Å.

In another embodiment of the invention, the area of a portion where the one or more pads extending from each of the pixel electrodes overlap the corresponding signal line is more than 50 $\mu m^2$ and less than 100 $\mu m^2$.

In still another embodiment of the invention, the insulating film comprises a photosensitive acrylic resin.

Alternatively, the active matrix liquid crystal panel of this invention includes: an active matrix substrate where a plurality of pixel electrodes and a plurality of switching elements for driving the pixel electrodes are arranged in a matrix on a substrate and scanning lines and signal lines connected with the respective switching elements are formed to cross each other; and a counter substrate including a counter electrode, wherein the counter substrate faces the active matrix substrate with a liquid crystal layer interposed therebetween, and wherein the pixel electrodes are formed on an insulating film covering the scanning lines, the signal lines, and the switching elements. Each of the pixel electrodes is electrically connected with a drain electrode of the corresponding switching element via a through hole formed through the insulating film, and cut portions are formed at both ends of each of the pixel electrodes along the corresponding signal line where the pixel electrode does not overlap the signal line, and at least one redundant line, which can be short-circuited with the signal lines, is formed outside each outermost scanning line.

Alternatively, a method for repairing a defect in an active matrix liquid crystal panel of this invention is provided. In the method, portions of the signal line, which are located in the cut portions sandwiching a defect where the signal line and the corresponding scanning line are short-circuited, are cut, and the redundant lines are short-circuited with both ends of the signal line.

Alternatively, the active matrix liquid crystal panel includes: an active matrix substrate where a plurality of pixel electrodes and a plurality of switching elements for driving the pixel electrodes are arranged in a matrix on a substrate and scanning lines and signal lines connected with the respective switching elements are formed to cross each other. The liquid crystal panel further includes a counter substrate having a counter electrode which faces the active matrix substrate with a liquid crystal layer interposed therebetween. The pixel electrodes are formed on an insulating film covering the scanning lines, the signal lines, and the switching elements, and each of the pixel electrodes is electrically connected with a drain electrode of the corresponding switching element via a through hole formed through the insulating film. Cuttable portions are formed at portions of the signal line corresponding to both ends of each of the pixel electrodes along the signal line where the pixel electrode does not overlap the signal line, and at least one redundant line, which can be short-circuited with the signal lines, is formed outside each outermost scanning line.

Alternatively, a method for repairing a defect in an active matrix liquid crystal panel of this invention is provided. In the method, the cuttable portions sandwiching a defect where the signal line and the corresponding scanning line are short-circuited are cut, and the redundant lines are short-circuited with both ends of the signal line.

Thus, the invention described herein makes possible the advantages of: (1) providing a liquid crystal panel where a point defect due to a switching failure or leakage in a TFT, as well as a line defect due to a disconnection of a signal line, can be repaired (2) a method for repairing such defects, (3)

providing a liquid crystal panel where a point defect can be repaired without decreasing the aperture ratio, (4) a method for repairing such a defect, (5) providing a liquid crystal panel where a defect due to short circuit between a scanning line and a signal line can be repaired, and (6) a method for repairing such a defect.

These and other advantages of the present invention will become apparent to those skilled in the art upon reading and understanding the following detailed description with reference to the accompanying figures.

BRIEF DESCRIPTION OF THE DRAWINGS

FIG. 1 is a plan view of one pixel of an active matrix liquid crystal panel of Example 1 according to the present invention.

DESCRIPTION OF THE PREFERRED EMBODIMENTS

The present invention will be described by way of examples with reference to the accompanying drawings.

EXAMPLE 1

Figure 2A:
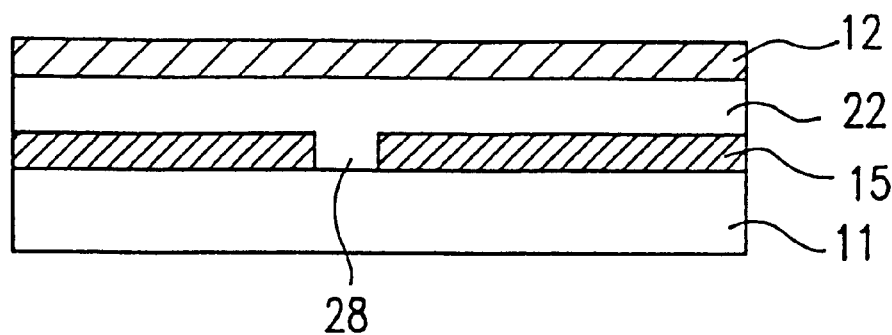
FIGS. 2A and 2B are sectional views of the pixel of the active matrix liquid crystal panel of FIG. 1 illustrating a disconnected scanning line, showing the states before and after the defect repair, respectively.
Figure 2B:
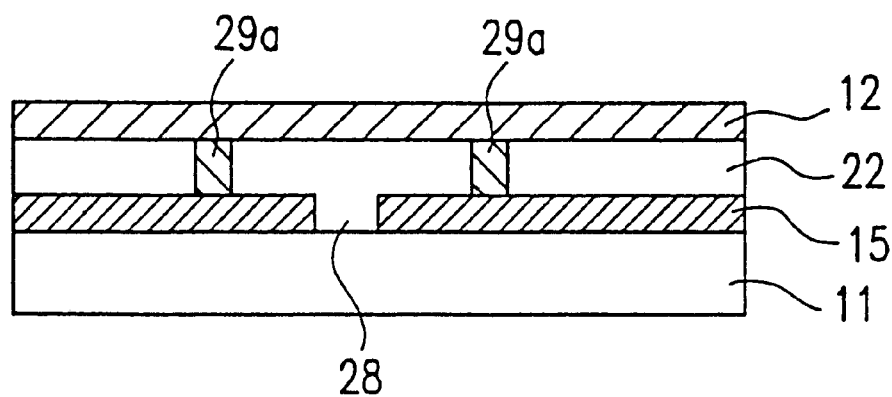

FIG. 1 is a plan view of one pixel of an active matrix substrate of an active matrix liquid crystal panel of Example 1 according to the present invention. FIGS. 2A and 2B are sectional views illustrating a disconnection of a scanning line.

The active matrix substrate shown in FIG. 1 includes an insulating substrate 11 (see FIGS. 2A and 2B) as in the aforementioned conventional active matrix substrate. A plurality of pixel electrodes 12 are formed in a matrix on the insulating substrate 11. TFTs 13 are connected to the respective pixel electrodes 12 as switching elements. A gate electrode of each TFT 13 is connected to a corresponding scanning line 15, so as to receive a gate signal from the scanning line 15 for controlling the driving of the TFT 13. A source electrode of the TFT 13 is connected to a corresponding signal line 17, so as to allow a data (display) signal to be input into the corresponding pixel electrode 12 when the gate signal is active to turn on the TFT 13. The scanning lines 15 and the signal lines 17 cross each other and run the peripheries of the respective pixel electrodes 12 arranged in a matrix. A drain electrode of each TFT 13 is connected to the corresponding pixel electrode 12. Cs signal lines (common lines) 16 are formed to run in parallel with the scanning lines 15 and cross the signal lines 17.

As shown in FIG. 1, each pixel electrode 12 overlaps the scanning line 15, the Cs signal line 16, and the signal line 17 via an insulating film 22 (see FIG. 2A) and a further insulating film (not shown in FIGS. 2A and 2B) which isolate the pixel electrode 12 from the lines 15, 16, and 17.

The scanning lines 15, the Cs signal lines 16, and the signal lines 17 may be made of Ta, Ti, Cr, or the like, for example. The pixel electrodes may be composed of a transparent conductive film made of ITO (indium tin oxide), for example. The gate insulating film 22 may be made of silicon nitride, silicon oxide, metal nitride such as tantalum nitride, metal oxide, or the like, for example. In this example, Ta is deposited on the insulating substrate 11 made of glass or the like to a thickness of about 0.3 μm. The resultant Ta film is patterned to form the scanning lines 15 and the Cs signal lines 16. A silicon nitride film with a thickness of 0.3 μm is then formed as the gate insulating film 22, and then a Ta film with a thickness of about 0.2 μm is formed and patterned to form the signal lines 17. Then, after the further insulating film is formed on the gate insulating film 22 covering the signal lines 17, the pixel electrodes 12 made of ITO with a thickness of about 0.15 μm are formed.

In the active matrix substrate with the above configuration, a method for repairing a defect due to a disconnection 28 of the scanning line 15 will be described.

The disconnected scanning line 15 and the overlapping pixel electrode 12 are electrically connected to each other, to use the pixel electrode 12 as a bypass for compensating the disconnection and thus to prevent an occurrence of a line defect. More specifically, two positions of the overlap portion of the pixel electrode 12 and the scanning line 15 which are located on either side of the disconnection 28 are irradiated with an energy beam from the side of the insulating substrate 11, to melt the positions of the pixel electrode 12. The irradiation conditions, including the irradiation time, are determined so that metal portions 29a, produced by the melting of the positions of the pixel electrode 12, extend through the insulating film 22 to come into contact with the scanning line 15. In this example, two positions marked "X" in FIG. 1 are irradiated with a YAG laser beam (wavelength: 1060 nm) for 0.1 μsec.

By the irradiation of an energy beam, the pixel electrode 12 and the disconnected scanning line 15 are electrically connected via the metal portions 29a as shown in FIG. 2B. Thus, a bypass of the scanning line 15 including one of the metal portions 29a, the pixel electrode 12, and the other metal portion 29a is established. Gate signals are transmitted through this bypass, thereby jumpering the disconnection 28. Thus, the gate signals can be supplied to the disconnected scanning line 15 which otherwise will not be supplied with the gate signals.

The defect repair can also be conducted in a manner similar to that described above when the Cs signal line 16 and the signal line 17 are disconnected.

Thus, according to the active matrix substrate in this example, each pixel electrode 12 overlaps the scanning line 15, the Cs signal line 16, and the signal line 17 via the insulating films 22. Accordingly, when only one disconnection arises for one pixel, a line defect due to the disconnection can be repaired. In this repair method, point defects arise for the pixels corresponding to the disconnected line. However, point defects are smaller and less conspicuous than a line defect, thereby improving the resultant display quality. As a result, the production yield improves and the production cost is greatly reduced. Since no spare line for compensating a disconnection is required, the area of the substrate can be reduced, and the occupation of the effective area required for display in the entire area can be increased.

EXAMPLE 2

An active matrix liquid crystal panel of Example 2 according to the present invention will be described with reference to FIGS. 3, 4A, and 4B, where the same components as those shown in FIGS. 1, 2A and 2B are denoted by the same reference numerals, and the description thereof is omitted.

Figure 3:
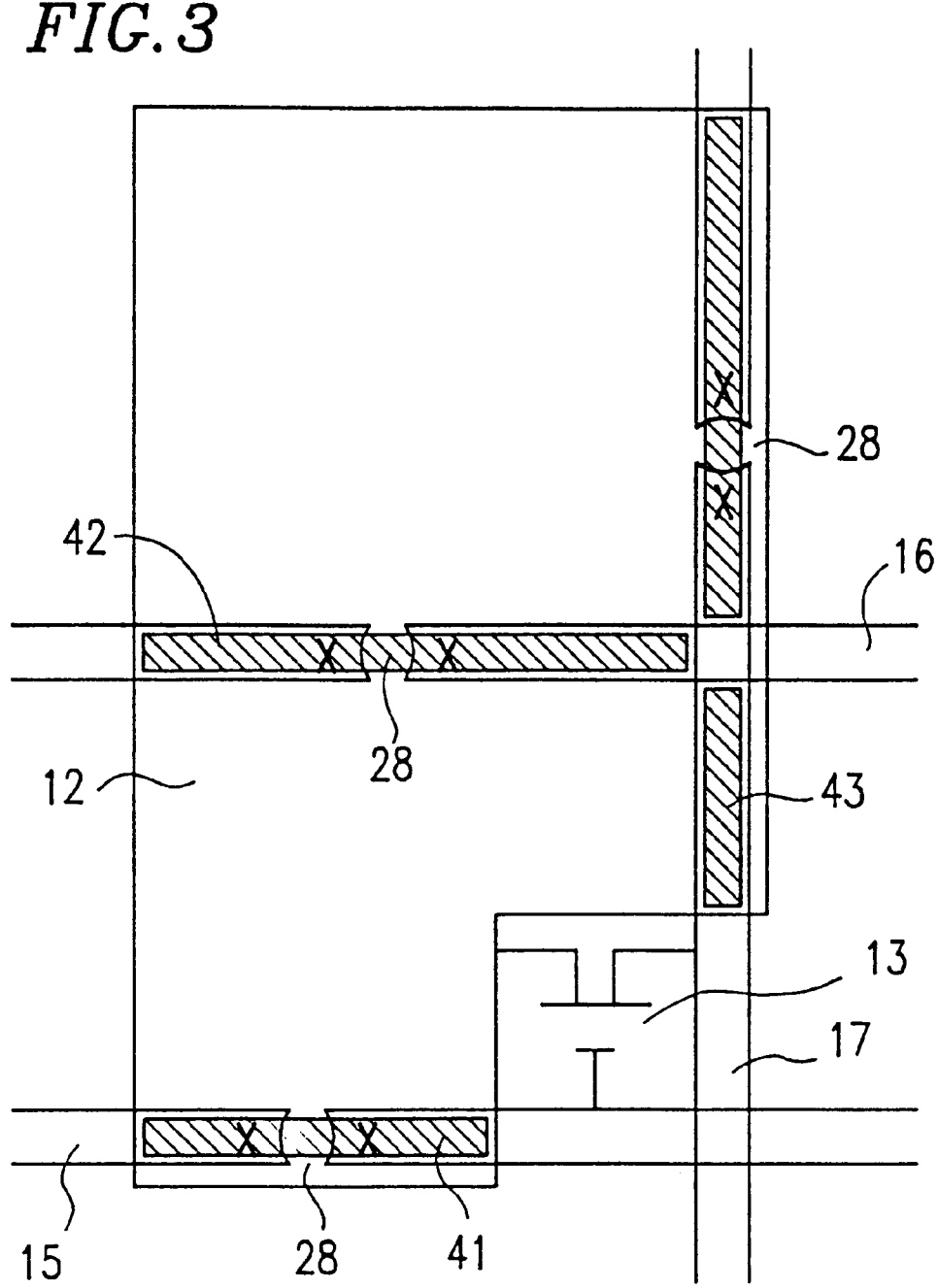
FIG. 3 is a plan view of one pixel of an active matrix liquid crystal panel of Example 2 according to the present invention.

FIG. 3 is a plan view of one pixel of an active matrix substrate in this example. The active matrix substrate in this example is different from the active matrix substrate in Example 1 in that conductive metal layers 41, 42, and 43 are formed for compensating a disconnection.

The conductive metal layers 41, 42, and 43 are formed in the overlap portion of the pixel electrode 12 and the scanning line 15, the overlap portion of the pixel electrode 12 and the Cs signal line 16, and the overlap portion of the pixel electrode 12 and the signal line 17, respectively, except for portions where two of the lines 15, 16, and 17 overlap each other, so as to compensate a disconnection which may arise at the scanning line 15, the Cs signal line 16, and the signal line 17. The conductive metal layers 41, 42, and 43 are made of Ta, Ti, Mo, Cr, or the like, for example.

Figure 4A:
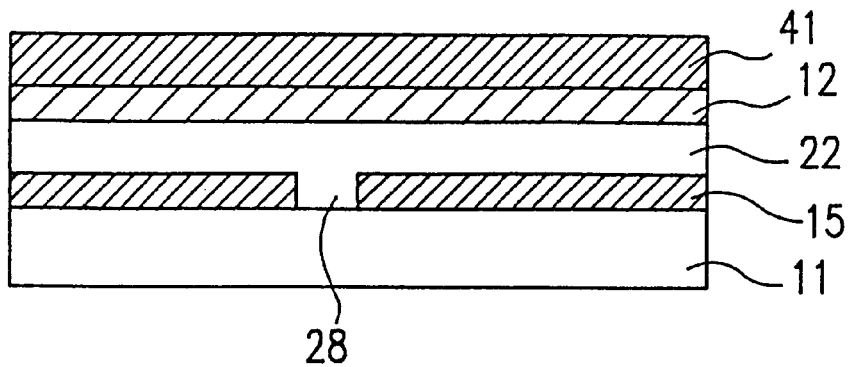
FIGS. 4 and 4B are sectional views of the pixel of the active matrix liquid crystal panel of FIG. 3 illustrating a disconnected scanning line, showing the states before and after the defect repair, respectively.

In this example, as shown in FIG. 4A, Ta is deposited on the insulating substrate 11 to a thickness of about 0.3 μm. The resultant Ta film is patterned to form the scanning lines 15 and the Cs signal lines 16 in a shape shown in FIG. 3. A silicon nitride film with a thickness of 0.3 μm is then formed as the gate insulating film 22, and then a Ta film with a thickness of about 0.2 μm is formed and patterned to form the signal lines 17. Then, after an insulating film 45 (shown in FIG. 5) is formed on the gate insulating film 22 covering the signal lines 17, the pixel electrodes 12 made of ITO with a thickness of about 0.15 μm are formed. Thereafter, the conductive metal layers 41, 42, and 43 made of Ta with a thickness of about 0.2 μm are formed on the pixel electrodes 12.

In the active matrix substrate with the above configuration, a method for repairing a defect due to a disconnection 28 of the scanning line 15 will be described.

In this example, the disconnected scanning line 15 and the overlapping conductive metal layer 41 are electrically connected to each other, to use the conductive metal layer 41 as a bypass for compensating the disconnection and thus to prevent an occurrence of a line defect. More specifically, two positions of the overlap portion of the conductive metal layer 41 and the scanning line 15, which are located on either side of the disconnection 28, are irradiated with an energy beam from the side of the insulating substrate 11, to melt the positions of the conductive metal layer 41. The irradiation conditions, including the irradiation time, are determined so that metal portions 29b produced by the melting of the positions of the conductive metal layer 41 extend through the insulating films 45 and 22 to come into contact with the scanning line 15. In this example, two positions marked "X" in FIG. 3 are irradiated with a YAG laser beam (wavelength: 1060 nm) for 0.1 μsec.

Figure 4B:
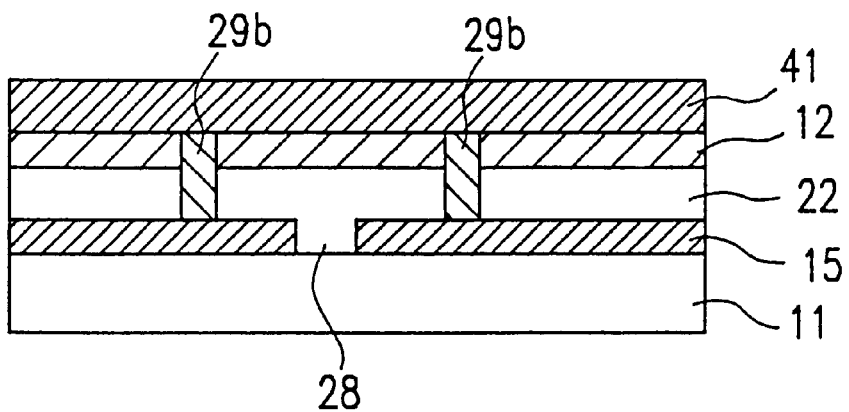

By the irradiation of an energy beam, the conductive metal layer 41 and the disconnected scanning line 15 are electrically connected via the metal portions 29b as shown in FIG. 4B. In other words, a bypass of the scanning line 15 including one of the metal portions 29b, the conductive metal layer 41 and the other metal portion 29b is established. Gate signals are transmitted through this bypass, thereby jumpering the disconnection 28. Thus, the gate signals can be supplied to the disconnected scanning line 15 which would otherwise not be supplied with the gate signals.

The repair of a defect due to a disconnection of the Cs signal line 16 can also be conducted in a manner similar to that described above using the conductive metal layer 42. Likewise, the repair of a defect due to a disconnection of the signal line 17 can also be conducted in a procedure similar to that described above using the conductive metal layer 43.

Figure 5:
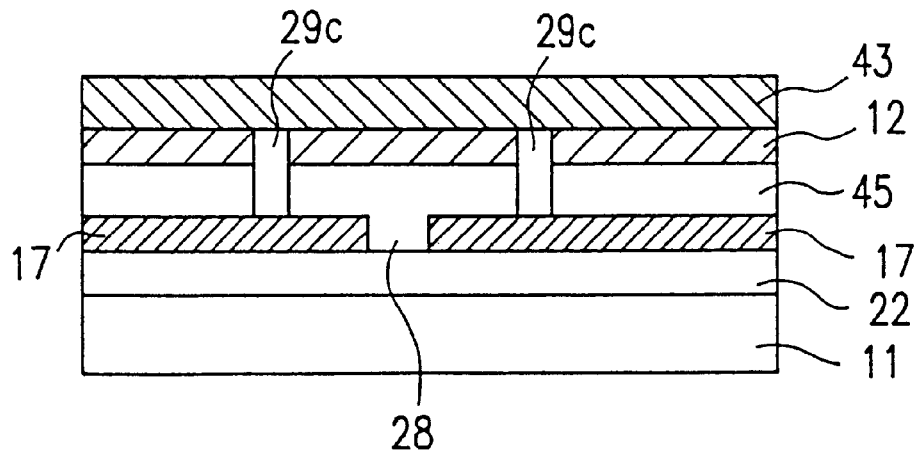
FIG. 5 is a sectional view of the pixel of the active matrix liquid crystal panel of FIG. 3 illustrating a disconnected signal line.

FIG. 5 is a sectional view of one pixel of the active matrix substrate illustrating the repair of a defect due to a disconnection 28 of the signal line 17. Two positions of the conductive metal layer 43 are melted by the irradiation of an energy beam to form metal portions 29c. Thus, a bypass of the signal line 17 includes one of the metal portions 29c, the conductive metal layer 43, and the other metal portion 29c, thereby establishing the signal line 17. Through this bypass, the signal line 17 can be electrically connected, allowing data signals to be transmitted to the disconnected signal line 17 which otherwise will not be supplied with the data signals.

Thus, according to the active matrix substrate in this example, the conductive metal layers 41, 42, and 43 overlap the scanning line 15, the Cs signal line 16, and the signal line 17, respectively, via the insulating films 22 and/or 45. Accordingly, when only one disconnection arises for one pixel, a line defect due to the disconnection can be repaired. In this repair method, point defects arise for the pixels corresponding to the disconnected line. However, point defects are smaller and less conspicuous than a line defect, thereby improving the resultant display quality. As a result, the production yield improves, and the production cost is greatly reduced. Since no spare line for compensating a disconnection is required, the area of the substrate can be reduced, and the occupation of the effective area required for display in the entire area can be increased.

EXAMPLE 3

An active matrix liquid crystal panel of Example 3 according to the present invention will be described with reference to FIGS. 6 and 7, where the same components as those shown in FIGS. 1 to 5 are denoted by the same reference numerals, and the description thereof is omitted.

Figure 6:
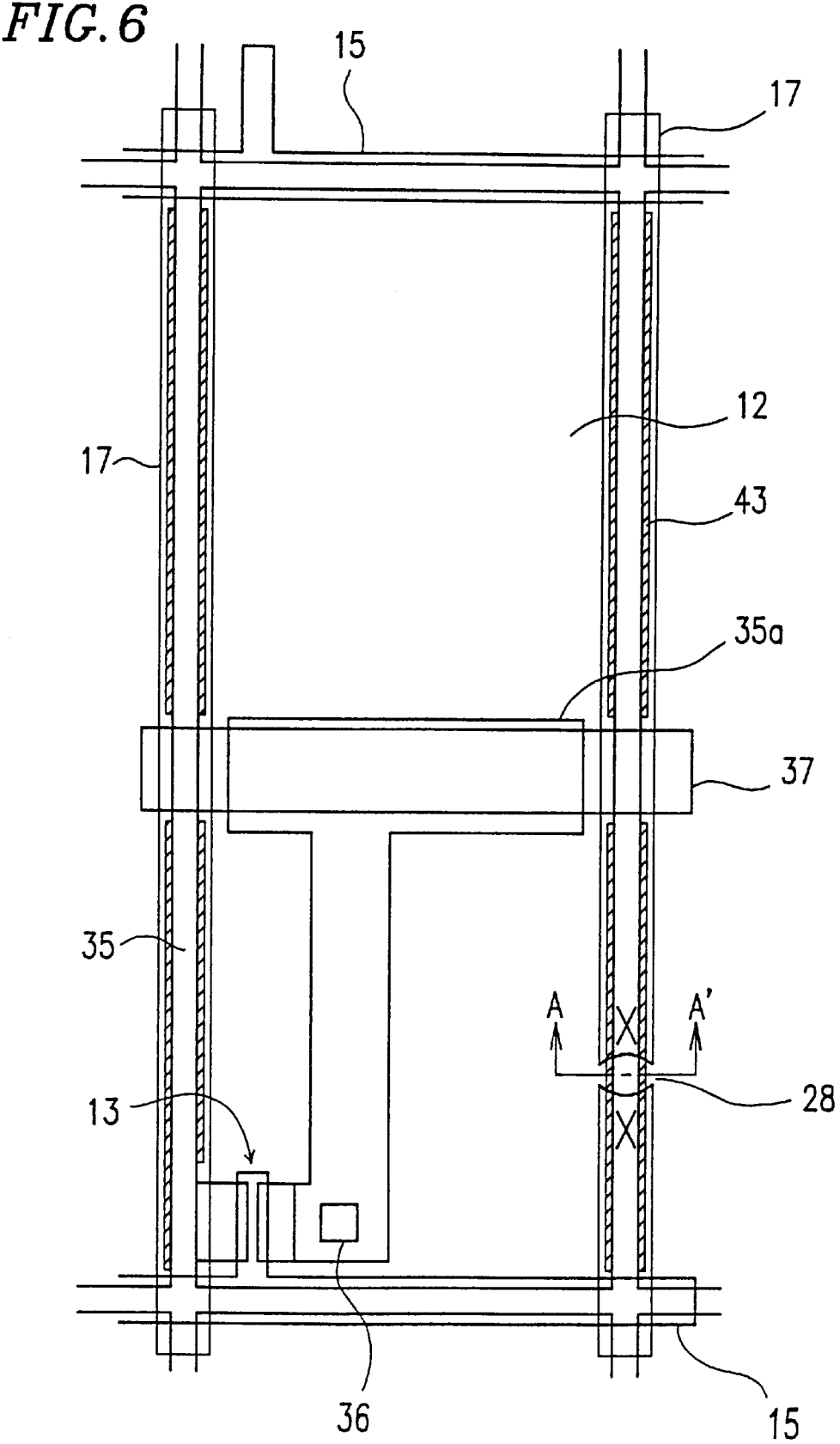
FIG. 6 is a plan view of one pixel of an active matrix liquid crystal panel of Example 3 according to the present invention.

FIG. 6 is a plan view of one pixel of an active matrix substrate in this example. FIG. 7 is a sectional view taken along line A–A' of FIG. 6. The active matrix substrate in this example is the same as the active matrix substrate in Example 2 in that the conductive metal layer 43 is formed in the overlap portion of the pixel electrode 12 and the signal line 17.

In this example, as in Examples 1 and 2, the scanning lines 15, the gate insulating film 22, and the signal lines 17 are formed on the insulating substrate 11. An interlayer insulating film 38 is then formed on the resultant substrate. The pixel electrodes 12 are formed on the interlayer insulating film 38 so as to overlap the scanning lines 15 and the signal lines 17. Lines 37, which serve as one of electrodes constituting respective storage capacitors, are also formed in parallel with the scanning lines 15. The pixel electrodes 12 also overlap the lines 37 which are the same as the Cs signal lines 16 in Examples 1 and 2. Contact holes 36 are formed through the interlayer insulating film 38. A drain electrode of each TFT 13 is connected to the corresponding pixel electrode 12 and a connecting electrode 35 via the corresponding contact hole 36.

The conductive metal layer 43 is formed in each overlap portion of the pixel electrode 12 and the signal line 17, except for the crossing portions of the signal line 17 with the scanning line 15 and the line 37, as described in Example 2. The conductive metal layer 43 may be made of Ta, Ti, Mo, Cr, or the like.

In this example, Ta is deposited on the insulating substrate 11 to a thickness of about 0.3 $\mu$m, and the resultant Ta film is patterned to form the scanning lines 15 and the lines 37 in a shape shown in FIG. 6. A silicon nitride film with a thickness of 0.3 $\mu$m is then formed as the gate insulating film 22, and then a Ta film with a thickness of about 0.2 $\mu$m is formed and patterned to form the signal lines 17. Then, after the interlayer insulating film 38 made of a resin with a thickness of about 2 $\mu$m is formed on the gate insulating film 22 covering the signal lines 17, the pixel electrodes 12 made of ITO with a thickness of about 0.15 $\mu$m are formed. Thereafter, the conductive metal layers 43, made of Ta with a thickness of about 0.2 $\mu$m, are formed on the pixel electrodes 12 by patterning.

The portions of the interlayer insulating film 38 where the pixel electrodes 12 overlap the signal lines 17 are made thinner than the other portions of the interlayer insulating film 38, to facilitate the electrical connection between the conductive metal layers 43 and the signal lines 17. In this example, the thickness of these thinned portions is about 0.5 $\mu$m.

In the active matrix substrate with the above configuration, a method for repairing a defect due to a disconnection 28 of the signal line 17 will be described.

In this example, as in Example 2, the disconnected signal line 17 and the overlapping conductive metal layer 43 are electrically connected to each other, to use the conductive metal layer 43 as a bypass for compensating the disconnection and thus fixing a line defect. More specifically, two positions of the overlap portion of the conductive metal layer 43 and the signal line 17, which are located on either side of the disconnection 28, are irradiated with an energy beam from the side of the insulating substrate 11, to melt the positions of the conductive metal layer 43. The irradiation conditions, including the irradiation time, are determined so that metal portions 29d produced by the melting of the positions of the conductive metal layer 43 extend through the interlayer insulating film 38 to come into contact with the signal line 17. In this example, two positions marked "X" in FIG. 6 are irradiated with a YAG laser beam (wavelength: 1060 nm) for 0.1 $\mu$sec.

Figure 7:
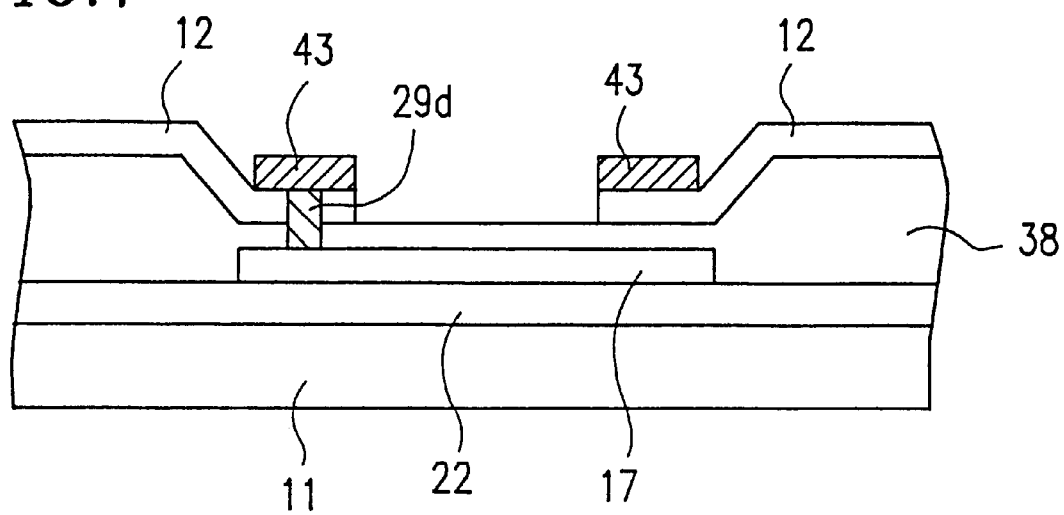
FIG. 7 is a sectional view of the pixel of the active matrix liquid crystal panel taken along line A–A' of FIG. 6 illustrating a disconnected signal line.

By the irradiation of an energy beam, the conductive metal layer 43 and the disconnected signal line 17 are electrically connected via the metal portions 29d as shown in FIG. 7. In other words, a bypass of the signal line 17 includes one of the metal portions 29d, the conductive metal layer 43, and the other metal portion 29d, thereby establishing the scanning line 17. Data signals are transmitted through this bypass, thereby jumpering the disconnection 28. Thus, the data signals can be supplied to the disconnected signal line 17 which otherwise would not be supplied with the data signals.

The repair of a defect due to a disconnection of the scanning line 15 and the line 37 can also be conducted in a manner similar to that described above. Conductive metal layers for compensating a disconnection of a line may also be formed for all the scanning lines 15, the signal lines 17, and the lines 37.

Thus, according to the active matrix substrate in this example, the conductive metal layer 43 overlaps the signal line 17 via the interlayer insulating film 38. Accordingly, when only one disconnection arises for one pixel, a line defect due to the disconnection can be repaired. In this repair method, point defects arise for the pixels corresponding to the disconnected line. However, point defects are smaller and less conspicuous than a line defect, thereby improving the resultant display quality. As a result, the production yield improves, and the production cost is greatly reduced. Since no spare line for compensating a disconnection is required, the area of the substrate can be reduced, and the occupation of the effective area required for display in the entire area can be increased.

As described above, in the active matrix liquid crystal panels of Examples 1, 2, and 3, when any of the scanning line, the Cs signal line, and the signal line of each pixel is disconnected, a line defect due to the disconnection can be repaired by forming a bypass connecting the disconnected line and the corresponding pixel electrode or the conductive metal layer formed on the pixel electrode.

Further, in the active matrix liquid crystal panels of Examples 1, 2, and 3, when one disconnection arises in each of the scanning line, the Cs signal line, and the signal line overlapped by the pixel electrode of one pixel, the disconnection can be compensated. As a result, the production yield improves, and the production cost is greatly reduced. Since no spare line for compensating a disconnection is required, the area of the substrate can be reduced, and the occupation of the effective area required for display in the entire area can be increased.

EXAMPLE 4

An active matrix liquid crystal panel of Example 4 according to the present invention will be described with reference to FIGS. 8A and 8B.

Figure 8A:
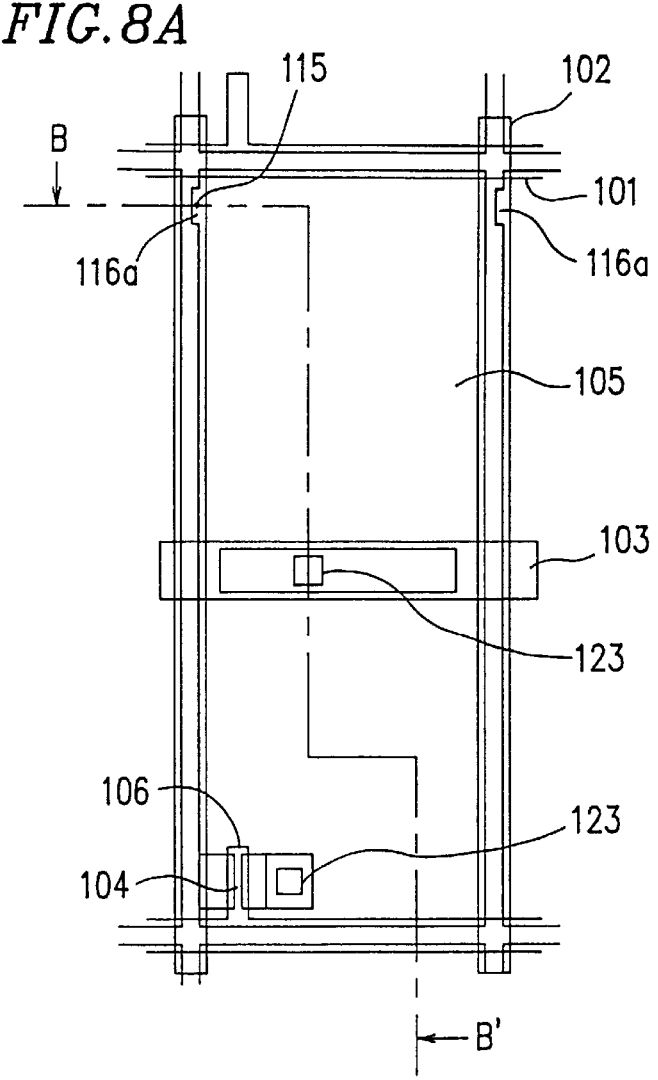
FIG. 8A is a plan view of one pixel of an active matrix liquid crystal panel of Example 4 according to the present invention.
Figure 8B:
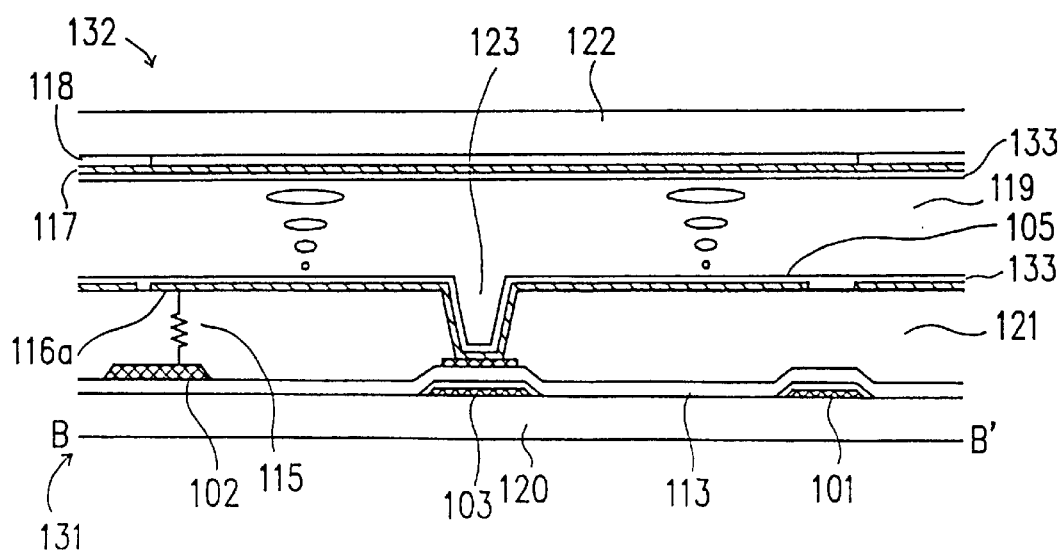
FIG. 8B is a sectional view taken along line B–B' of FIG. 8A.
Figure 21:
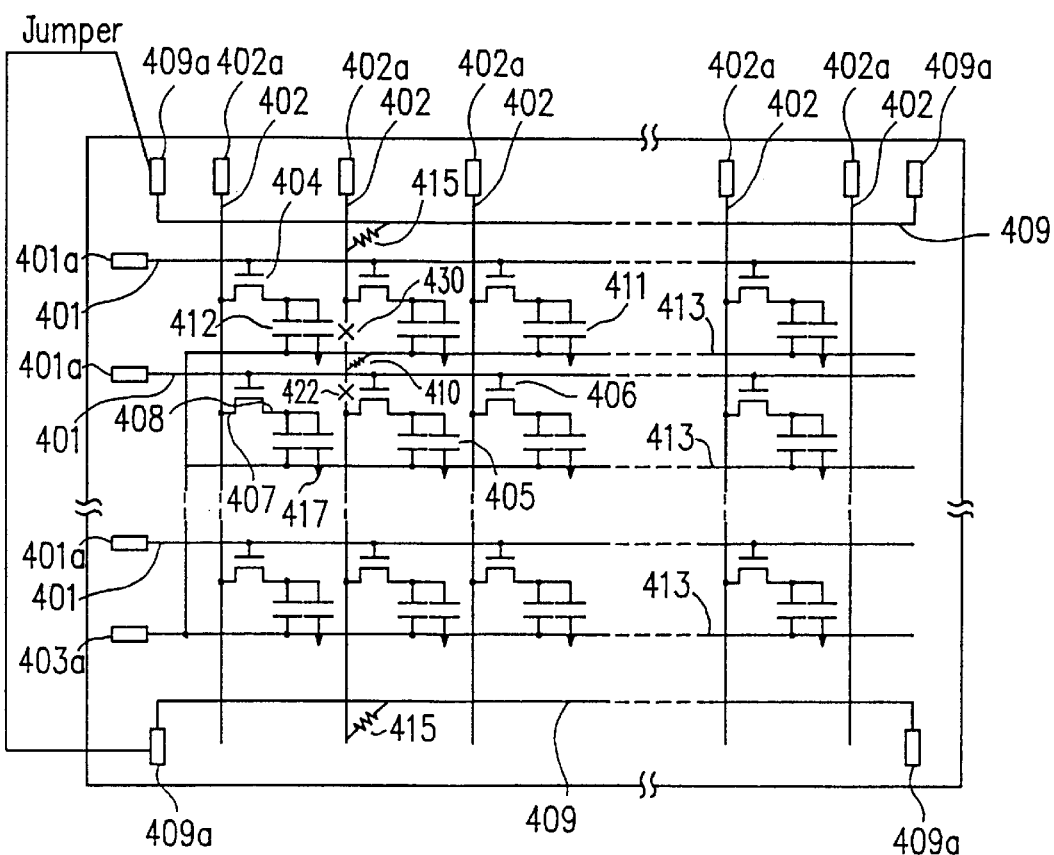
FIG. 21 is a view for describing a method for repairing line defects due to a short circuit between a scanning line and a signal line and a disconnection of a signal line in the active matrix substrate of FIG. 17.
Figure 22A:
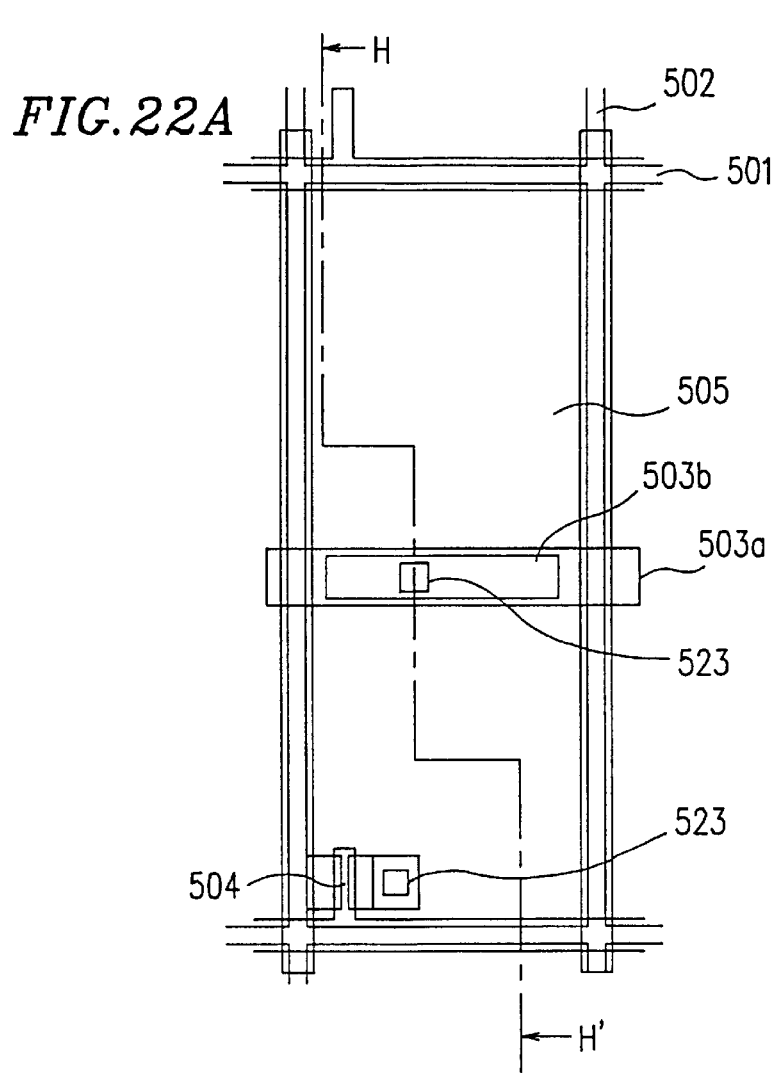
FIG. 22A a plan view of one pixel of a conventional POP-structure active matrix liquid crystal panel.
Figure 22B:
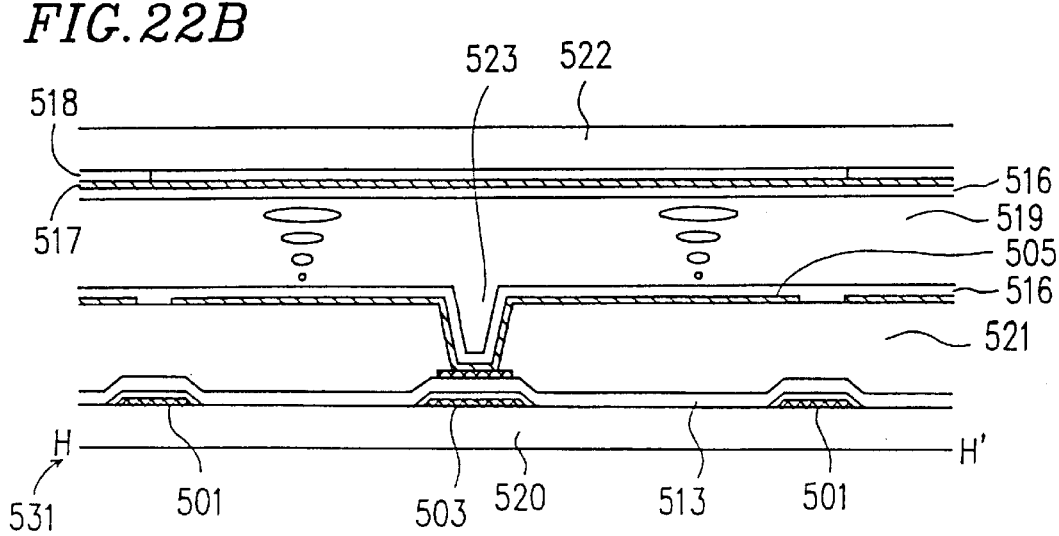
FIG. 22B is a sectional view taken along line H–H' of FIG. 22A.

FIG. 8A is a plan view of one pixel of the active matrix liquid crystal panel of this example. FIG. 8B is a sectional view taken along line B–B' of FIG. 8A. The equivalent circuit diagram of the liquid crystal panel of this example is the same as that shown in FIG. 21.

The active matrix panel of this example includes an active matrix substrate 131 and a counter substrate 132 which face each other with a liquid crystal layer 119 interposed therebetween. The counter substrate 132 includes an insulating substrate 122 and a color filter 118, a counter electrode 117, and an alignment film 133 formed in this order on the surface of the insulating substrate 122 facing the liquid crystal layer 119.

The active matrix substrate 131 includes an insulating substrate 120 and scanning lines 101 and signal lines 102 formed on the insulating substrate 120 to cross each other. TFTs 104 are formed in the vicinity of the crossings of the scanning lines 101 and the signal lines 102 as switching elements. Branches 106 of the scanning lines 101 are used as the gate electrodes of the TFTs 104. The source electrodes of the TFTs 104 are directly connected to the corresponding signal lines 102, while the drain electrodes of the TFTs 104 are electrically connected to corresponding pixel electrodes 105. Such pixel electrodes 105 are formed on an insulating film 121 covering the scanning lines 101, the signal lines 102, and the TFTs 104. The pixel electrodes 105 are electrically connected to the drain electrodes of the TFTs 104 via corresponding through holes formed through the insulating film 121. Thus, the active matrix substrate 131 is of the pixel on passivation (POP) structure. Another alignment film 133 is formed on the surface of the resultant active matrix substrate facing the liquid crystal layer 119.

Each pixel electrode 105 has a pad 116a extending to the adjacent signal line 102 to overlap the signal line 102. This pad 116a is used to repair a point defect due to switching failure or leakage of the TFT 104.

More specifically, when a switching failure or leakage arises in a certain TFT 104, the pad 116a of the pixel electrode 105 connected to the TFT 104 is irradiated with an energy beam, such as side of them, from the side of the insulating substrate 120 of the active matrix substrate 131. The pad 116a melts by the irradiation and forms a connection 115 which comes into contact with the signal line 102. The pixel electrode 105 and the signal line 102 are thus directly connected via the connection 115. This makes it possible to directly input data on the signal line 102 into the pixel electrode 105, making the point defect inconspicuous.

EXAMPLE 5

An active matrix liquid crystal panel of Example 5 according to the present invention will be described with reference to FIGS. 9A and 9B.

Figure 9A:
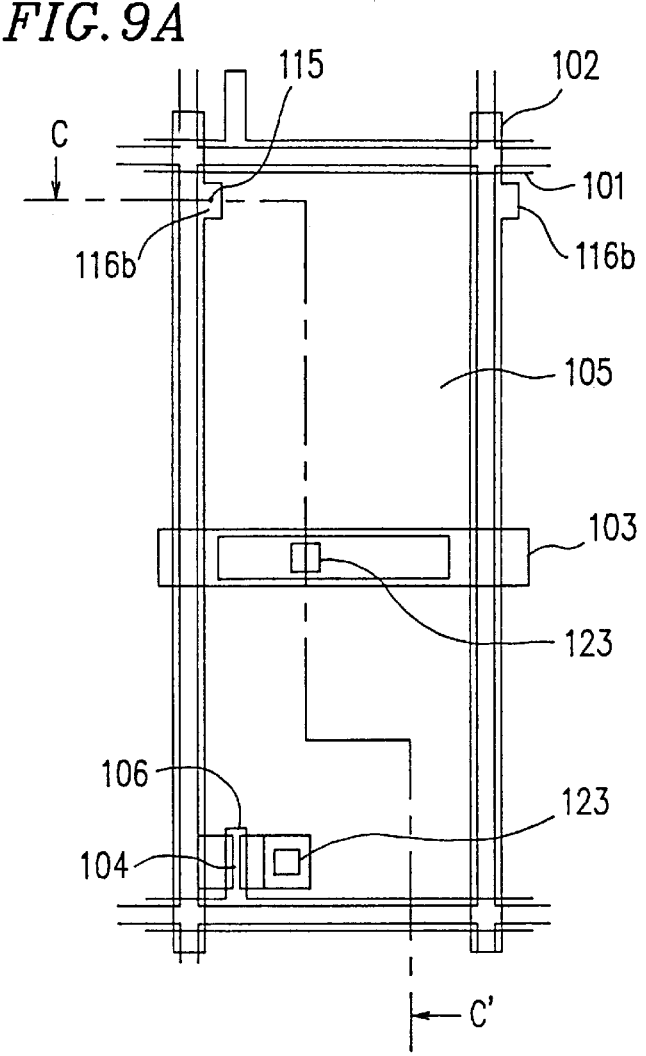
FIG. 9A is a plan view of one pixel of an active matrix liquid crystal panel of Example 5 according to the present invention.
Figure 9B:
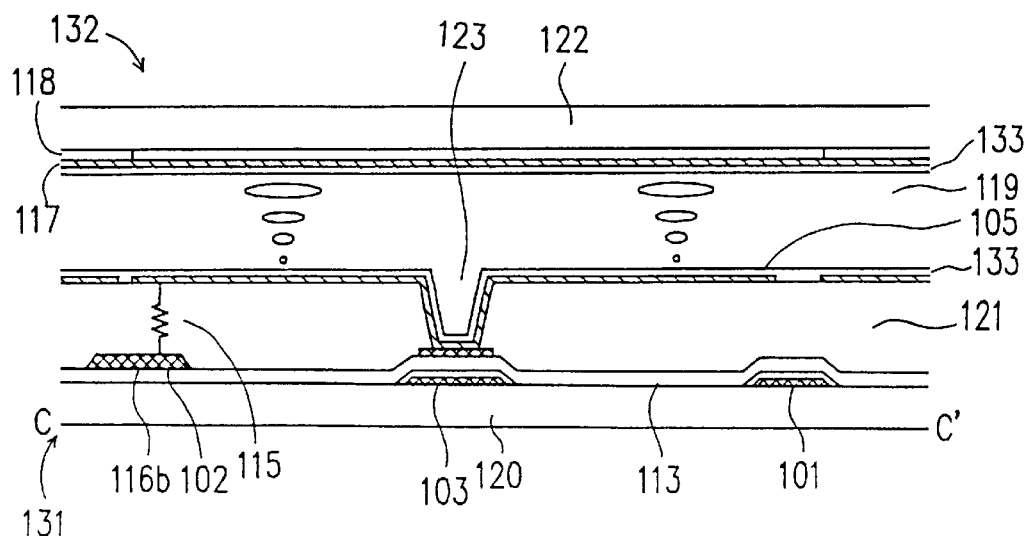
FIG. 9B is a sectional view taken along line C–C' of FIG. 9A.

FIG. 9A is a plan view of one pixel of the active matrix liquid crystal panel of this example. FIG. 9B is a sectional view taken along line C–C' of FIG. 9A. The same components as those shown in FIGS. 8A and 8B are denoted by the same reference numerals, and the description thereof is omitted. The equivalent circuit diagram of the liquid crystal panel of this example is the same as that shown in FIG. 21.

The liquid crystal panel of this example is the same as the liquid crystal panel of Example 4 except that a pad 116b extends from the signal line 102 instead of the pad 116a extending from the pixel electrode 105 in Example 4. The pad 116b extends to an underneath portion of the pixel electrode 105, where the pixel electrode 105 and pad 116b overlap each other.

The repair of a point defect is conducted in the same manner as that described in Example 4. That is, when a switching failure or leakage arises in a certain TFT 104, the overlap portion of the pixel electrode 105 and the pad 116b is irradiated with an energy beam such as a laser beam from the side of the insulating substrate 120 of the active matrix substrate 131. By the irradiation, the pixel electrode 105 and the pad 116b are electrically connected via the connection 115 shown in FIG. 9B. This makes it possible to directly input data on the signal line 102 into the pixel electrode 105, thereby making the point defect inconspicuous.

EXAMPLE 6

An active matrix liquid crystal panel of Example 6 according to the present invention will be described with reference to FIGS. 10A and 10B.

Figure 10A:
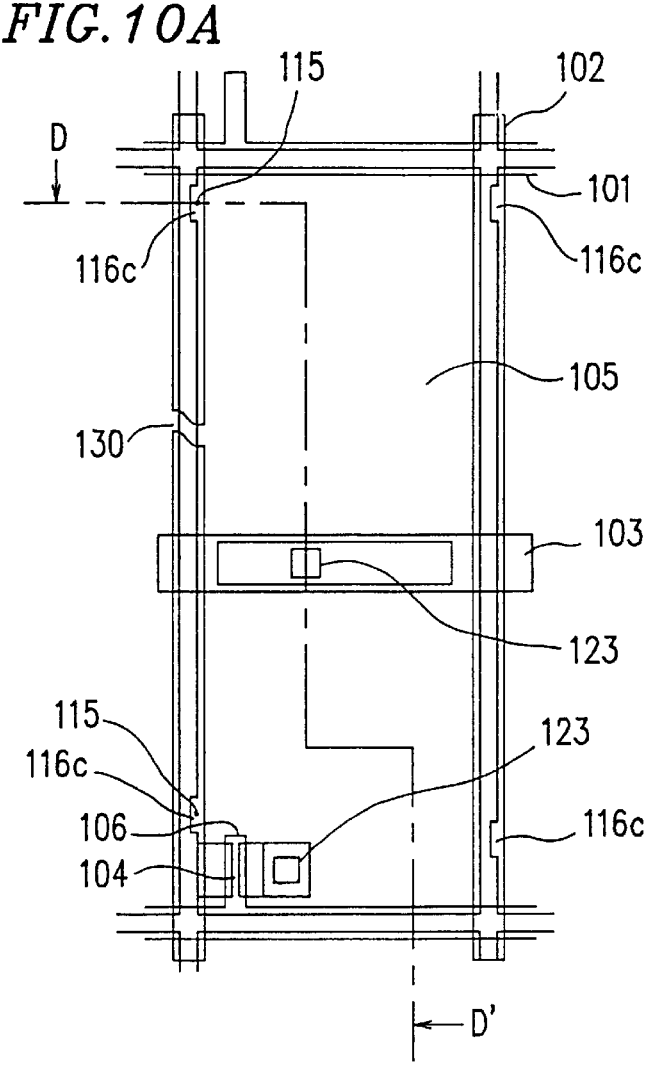
FIG. 10A is a plan view of one pixel of an active matrix liquid crystal panel of Example 6 according to the present invention.
Figure 10B:
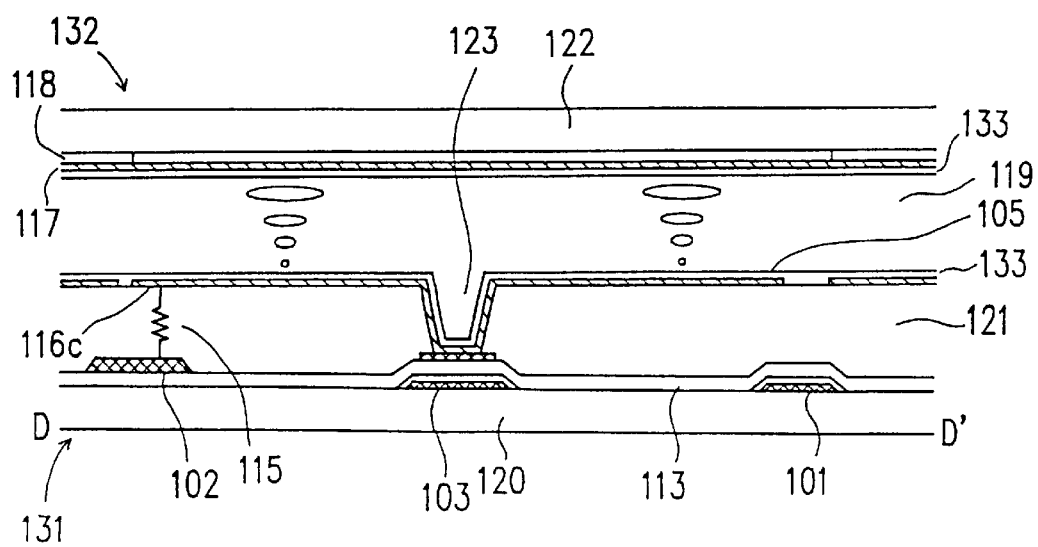
FIG. 10B is a sectional view taken along line D–D' of FIG. 10A.

FIG. 10A is a plan view of one pixel of the active matrix liquid crystal panel of this example FIG. 10B is a sectional view taken along line D–D' of FIG. 10A. The same components as those shown in FIGS. 8A to 9B are denoted by the same reference numerals, and the description thereof is omitted. The equivalent circuit diagram of the liquid crystal panel of this example is the same as that shown in FIG. 21.

The liquid crystal panel of this example is the same as the liquid crystal panel of Example 4 except that two pads 116c extend from one pixel electrode 105 to overlap one adjacent signal line 102.

The repair of a point defect is conducted in the same manner as that described in Example 4. That is, when a switching failure or leakage arises in a certain TFT 104, the two pads 116c of the pixel electrode 105 connected to the TFT 104 are irradiated with an energy beam, such as a laser beam, from the side of the insulating substrate 120 of the active matrix substrate 131. The pads 116c melt by the irradiation and form the connections 115 which comes into contact with the signal line 102. The pixel electrode 105 and the signal line 102 are thus directly connected via the connections 115. This makes it possible to directly input data on the signal line 102 into the pixel electrode 105 thereby making the point defect inconspicuous.

In this example, since two pads extending from the pixel electrode 105 overlap one adjacent signal line 102, a line defect which arises when the signal line 102 is disconnected can be remedied. More specifically, when the signal line 102 has a disconnection 130 as shown in FIG. 10A, the two pads 116c are irradiated with a laser beam, so that the pixel electrode 105 and the signal line 102 are connected via the two connections 115 formed by the irradiation. Thus, data on the signal line 102 can be directly input into the pixel electrode 105. A bypass of the signal line 102 includes one of the connections 115, the pixel electrode 105, and the other connection 115, wherein the signal line 102 is formed by jumpering the disconnection 130 of the signal line 102. This allows the signal line 102 to be connected by jumpering the disconnection 130 without the use of a redundant line.

The above line defect repair is not possible when the signal line 102 is disconnected at a position outside the region sandwiched by the two pads 116c of the pixel electrode 105. Accordingly, in order to reduce the possibility of the occurrence of an unrepairable line defect, the two pads 116c of each pixel electrode 105 are preferably formed at positions closer to the ends of the pixel, i.e., near the crossings of the signal line 102 with the scanning lines 101.

EXAMPLE 7

An active matrix liquid crystal panel of Example 7 according to the present invention will be described with reference to FIGS. 11A and 11B.

Figure 11A:
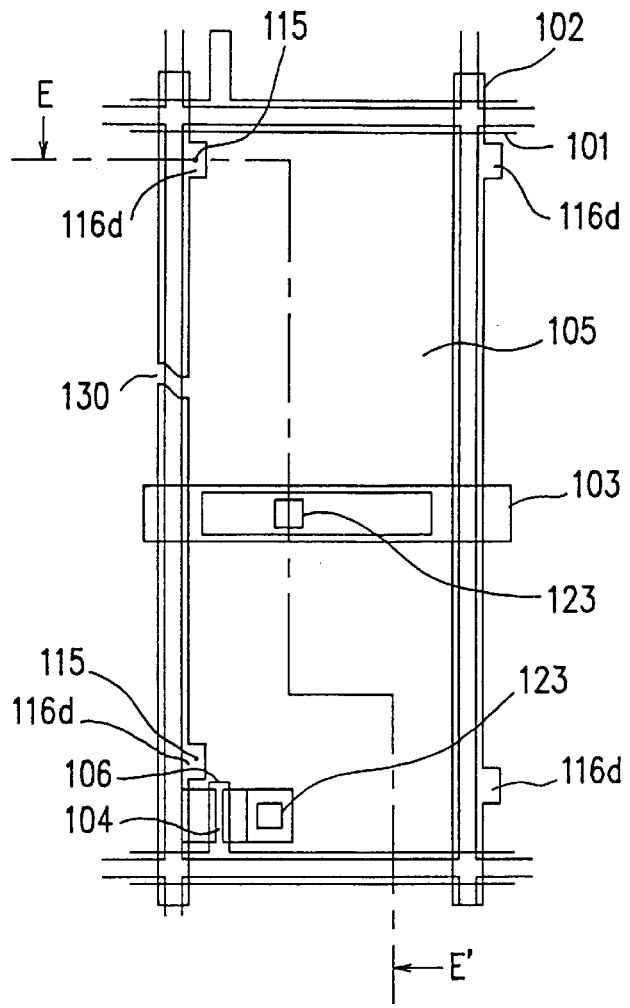
FIG. 11A is a plan view of one pixel of an active matrix liquid crystal panel of Example 7 according to the present invention.
Figure 11B:
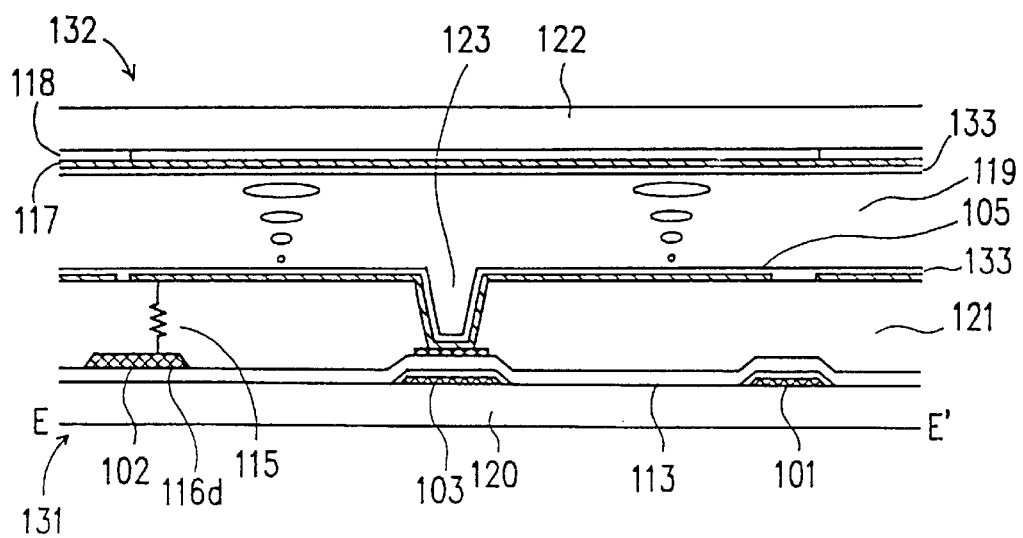
FIG. 11B is a sectional view taken along line E–E' of FIG. 11A.

FIG. 11A is a plan view of one pixel of the active matrix liquid crystal panel of this example. FIG. 11B is a sectional view taken along line E–E' of FIG. 11A. The same components as those shown in FIGS. 8A to 10B are denoted by the same reference numerals, and the description thereof is omitted. The equivalent circuit diagram of the liquid crystal panel of this example is the same as that shown in FIG. 21.

The liquid crystal panel of this example is the same as the liquid crystal panel of Example 6 except that two pads 116d for defect repair extend from one signal line 102 adjacent to each pixel electrode 105, not from the pixel electrode 105, so as to be overlapped by the pixel electrode 105.

The repair of a point defect is conducted in the same manner as that described in Example 6. That is, when a switching failure or leakage arises in a certain TFT 104, the two pads 116d overlapped by the pixel electrode 105 connected to the TFT 104 are irradiated with an energy beam such as a laser beam from the side of the insulating substrate 120 of the active matrix substrate 131. By the irradiation, the pixel electrode 105 and the two pads 116d are connected via the connections 115 shown in FIG. 11B, allowing the pixel electrode 105 and the signal line 102 to be directly connected. This makes it possible to directly input data on the signal line 102 into the pixel electrode 105, thereby making the point defect inconspicuous.

In this example, as in Example 6, since the pixel electrode 105 overlaps the two pads 116d extending from one adjacent signal line 102, a line defect which arises when the signal line 102 is disconnected can be prevented. More specifically, when the signal line 120 has a disconnection 130 as shown in FIG. 11A, the two pads 116d are irradiated with a laser beam, so that the pixel electrode 105 and the signal line 102 are connected via two connections 115 formed by the irradiation. Thus, data on the signal line 102 can be directly input into the pixel electrode 105. A bypass of the signal line 102 includes one of the connections 115, the pixel electrode 105, and the other connection 115, wherein the signal line 102 is formed by jumpering the disconnection 130 of the signal line 102. This allows the signal line 102 to be connected by jumpering the disconnection 130 without the use of a redundant line.

The above line defect repair is not possible when the signal line 102 is disconnected at a position outside the region sandwiched by the two pads 116d of the pixel electrode 105. Accordingly, in order to reduce the possibility of the occurrence of an unrepairable line defect, the two pads 116d of each pixel electrode 105 are preferably formed at positions closer to the ends of the pixel, i.e., near the crossings of the signal line 102 with the scanning lines 101.

In Examples 4 to 7, the pads for defect repair may be of any shape. The size of the pads may be about 6 μm×6 μm as far as the insulating film 121 formed on the signal lines 102, the scanning lines 101, and the TFTs 104 and under the pixel electrodes 105 has a normal thickness of 3 μm. The size of the pads should be appropriately changed depending on the thickness of the insulating film 121. The portions of the insulating film 121 located on the pads may be thinned, as required.

In these examples, the pads are used, instead of largely overlapping the pixel electrode with the adjacent signal line, to prevent a parasitic component, which is generated between the pixel electrode and the signal line, from increasing.

A YAG laser beam may be used as the laser beam radiated to the pads.

As described above, in the active matrix liquid crystal panels of the POP structure in Examples 4 and 5, one pad for defect repair extends from the pixel electrode or the signal electrode for each pixel. When the pad extends from the pixel electrode, the pad overlaps the signal line. When the pad extends from the signal line, the pad is overlapped by the pixel electrode. In such a liquid crystal panel, when one TFT has a defect, the pad corresponding to the pixel electrode connected to the defective TFT is irradiated with a laser beam, so as to directly connect the pixel electrode and the signal line. This allows data signals on the signal line to be directly input into the pixel electrode, making the point defect inconspicuous. Further, the aperture ratio increases, and the production yield improves.

Also, when two or more pads are formed for each pixel as described in Examples 6 and 7, not only is a point defect made inconspicuous, but also a line defect, which arises due to a disconnection of the signal line, can be compensated. By forming the pads at positions closer to the ends of each pixel, a disconnection at any position of the signal line can be compensated. This improves the production yield, and thus prevents defective liquid crystal panels from being delivered to the market. That is, the quality and reliability of the liquid crystal panels improve.

EXAMPLE 8

An active matrix liquid crystal panel of Example 8 according to the present invention will be described with reference to FIGS. 12 to 14.

Figure 12:
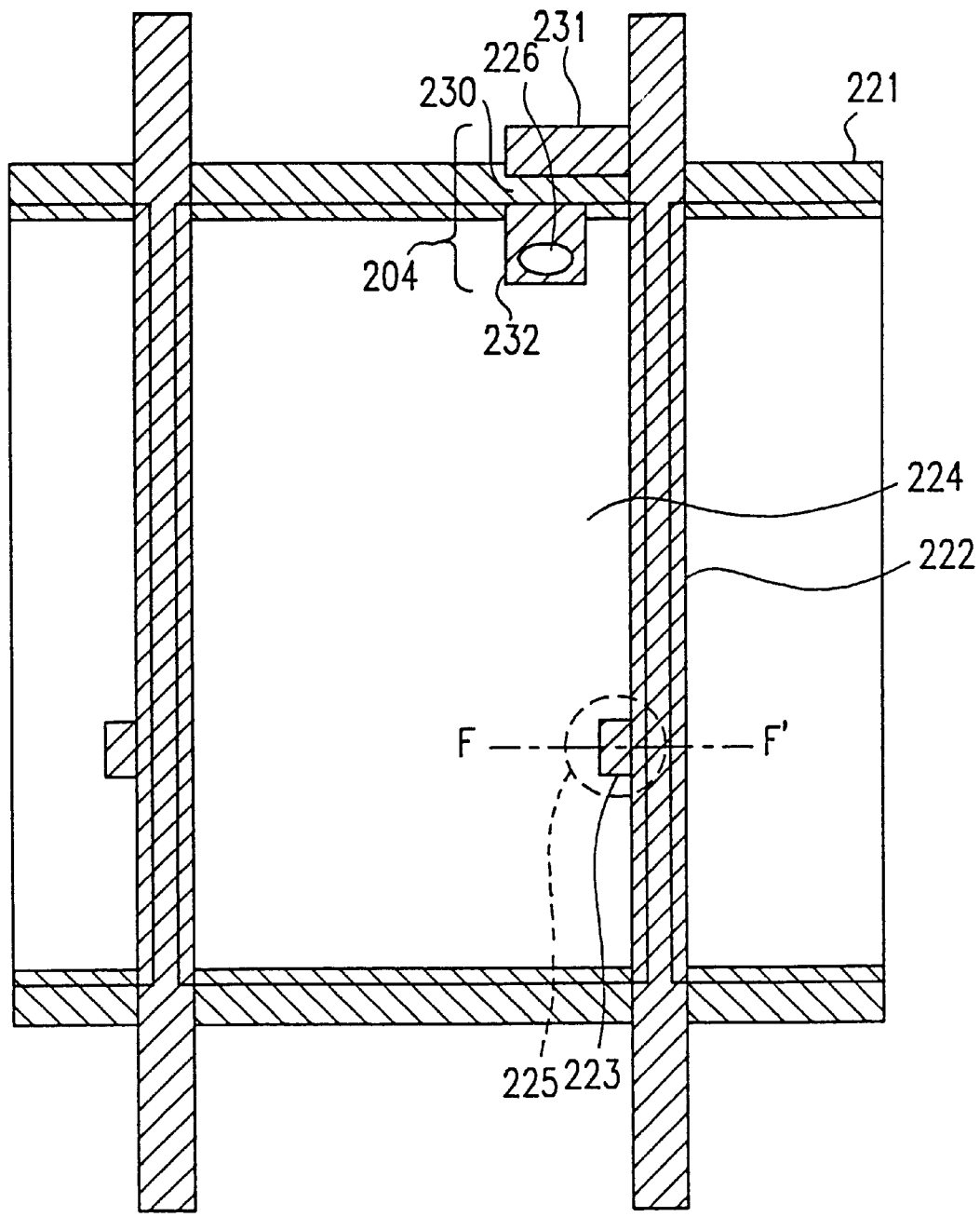
FIG. 12 is a plan view of one pixel of an active matrix liquid crystal panel of Example 8 according to the present invention.

FIG. 12 is a plan view of one pixel of an active matrix substrate of the active matrix liquid crystal panel of this example. FIG. 13 is a sectional view taken along line F–F' of FIG. 12.

The active matrix substrate includes a substrate 210 on which scanning lines 221 and signal lines 222 are formed to cross each other. A region surrounded by two adjacent scanning lines 221 and two adjacent signal lines 222 constitutes a pixel. TFTs 204 are formed in the vicinity of the respective crossings of the scanning lines 221 and the signal lines 222. Each TFT 204 uses a part of the corresponding scanning line 221 as its gate electrode 230. The gate electrode 230 faces a semiconductor layer (not shown) via a gate insulating film 211 (see FIG. 13). A source electrode 231 of each TFT 204 is composed of a branch of the corresponding signal line 222.

An insulating film 212 made of a photosensitive acrylic resin is formed on the resultant substrate, and the pixel electrodes 224 are formed on the insulating film 212. Each pixel electrode 224 is connected to a drain electrode 232 of the corresponding TFT 204 via a contact hole 226.

The signal lines 222 have a connection projection 223 extending therefrom to each of the corresponding pixel electrodes 224, to allow each pixel electrode 224 and the corresponding signal line 222 to overlap each other via the insulating film 212 at the connection projection 223.

Figure 13:
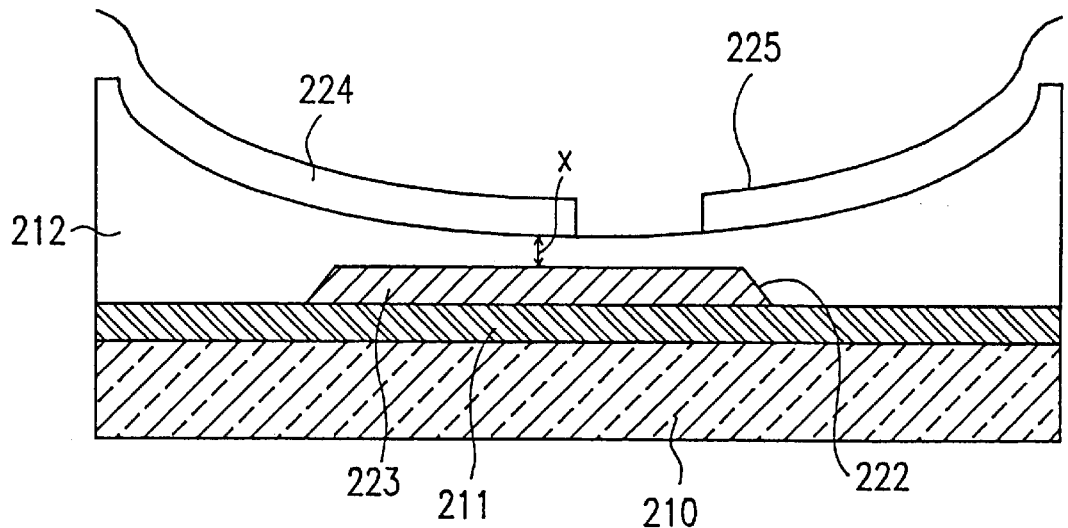
FIG. 13 is a sectional view taken along line F–F' of FIG. 12.

The region of the insulating film 212 where each connection projection 223 is formed together with its surroundings, shown as the reference numeral 225 in FIG. 13, is made thinner than the other region thereof, as is shown as a thickness "x" in FIG. 13, for the following reason. The insulating film 212 and the contact holes 226 through the insulating film 212 can be formed more easily by using photosensitive acrylic resin as the material of the insulating film 212. The thickness of such an insulating film 212 is normally 2 μm or more in order to prevent capacitive coupling from occurring between each pixel electrode 224 and the corresponding signal line 222. At the point defect repair, however, it is difficult to penetrate such a thick photosensitive acrylic resin film with irradiation of a laser beam and the like. To overcome this problem, the thickness "x" of the region 225 of the insulating film 212 is made smaller. The thickness "x" is desirably 5000 Å or less.

The signal line 222 and the pixel electrode 224 should be electrically isolated in their overlap portion when point defect repair is not conducted. The thickness "x" of the region 225 of the insulating film 212 is therefore desirably 2000 Å or more. This desirable range of the thickness "x" of 2000 to 5000 Å is applicable for the insulating film 212 made of photosensitive acrylic resin. This range of thickness "x" may therefore vary when other materials are used.

When the thickness x of the region 225 of the insulating film 212 is 5000 Å or less, the capacitance between the pixel electrode 224 and the signal line 222 in the overlap portion decreases, causing capacitive coupling. This capacitive coupling may affect the display if the overlap portion is large. The overlap portion of the pixel electrode 224 and the signal line 222 is a redundant structure required for defect repair. If the overlap portion is large, it may affect the aperture ratio. The area of the overlap portion is therefore desirably 100 $\mu m^2$ or less. On the other hand, in order to irradiate the overlap portion with an energy beam such as a laser beam with high controllability and attain sufficient electrical connection between the signal line 222 and the pixel electrode 224, it is desirable to set the area of the overlap portion to be 25 $\mu m^2$ or more, preferably 50 $\mu m^2$ or more.

Such an insulating film 212 which has the reduced thickness "x" at the region 225 where the connection projection 223 is formed in the center is formed in the following manner, for example.

A photosensitive acrylic resin is applied to the surface of the substrate 210 where the signal lines 222 and the TFTs 204 are formed. The photosensitive acrylic resin is then exposed to light and developed. This process allows the formation of the insulating film 212 and the formation of the contact holes 226 for connecting the drain electrodes 232 of the TFTs 204 and the pixel electrodes 224 to be conducted simultaneously. In this process, a pattern, as shown in FIG. 13, is placed, in addition to a photomask at the light exposure, to make the region 225 covered with the pattern thinner.

The thickness of the portion of the insulating film 212 where each contact hole 226 is to be formed through the insulating film 212 (to come into contact with the semiconductor layer) should be appropriately controlled. Also, the thickness "x" of the region 225 of the insulating film 212 corresponding to each overlap portion of the pixel electrode 224 and the signal line 222 should be secured to prevent an occurrence of a short circuit between the pixel electrode 224 and the signal line 222. Such thickness control can be conducted by controlling the amount of exposed light when a photosensitive acrylic resin is used for the insulating film 212. For example, the portion where the contact hole 226 is to be formed is exposed to light for 6000 ms, while the region 225 is expoms to light for only about 3000 ms. Then, the entire insulating film is developed in a normal manner. As a result, a depression is formed in each region 225 where the connection projection 223 is formed, thereby thinning the region 225 compared with the other region of the insulating film 212. Simultaneously, a through hole is formed in each portion where the contact hole 226 is to be formed.

Figure 23:
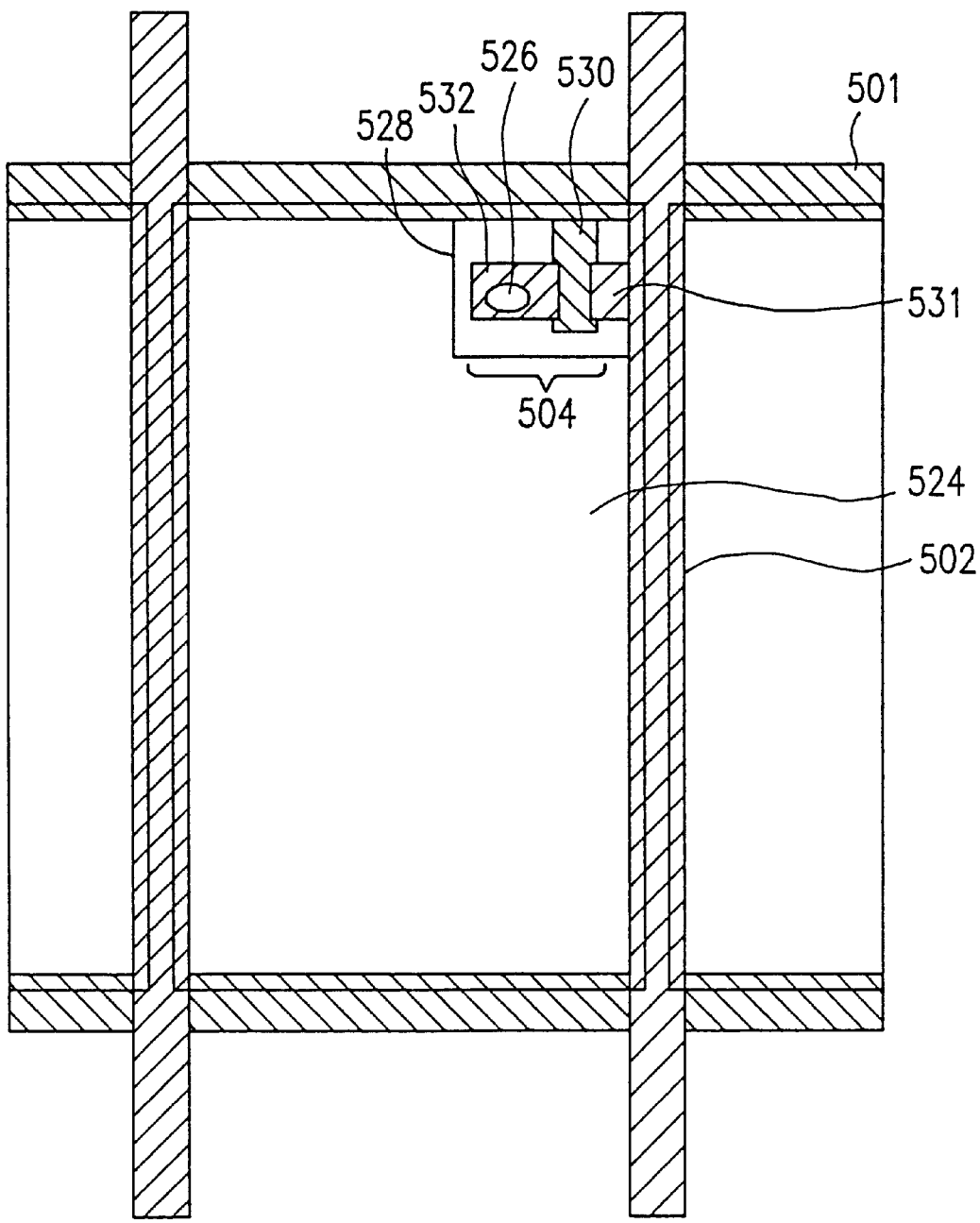
FIG. 23 is a partial enlarged plan view of the active matrix substrate of FIG. 22A focusing a TFT and the vicinity thereof.

The active matrix substrate in this example shown in FIGS. 12 and 13 has only the connection projection 223 as a redundant structure required for defect repair for each pixel. Therefore, the aperture ratio of the resultant display device improves compared with the conventional display device as shown in FIG. 23 where the region 528 needs to be light-shaded.

The repair of a point defect which arises in the active matrix liquid crystal panel of this example will be described.

Figure 14:
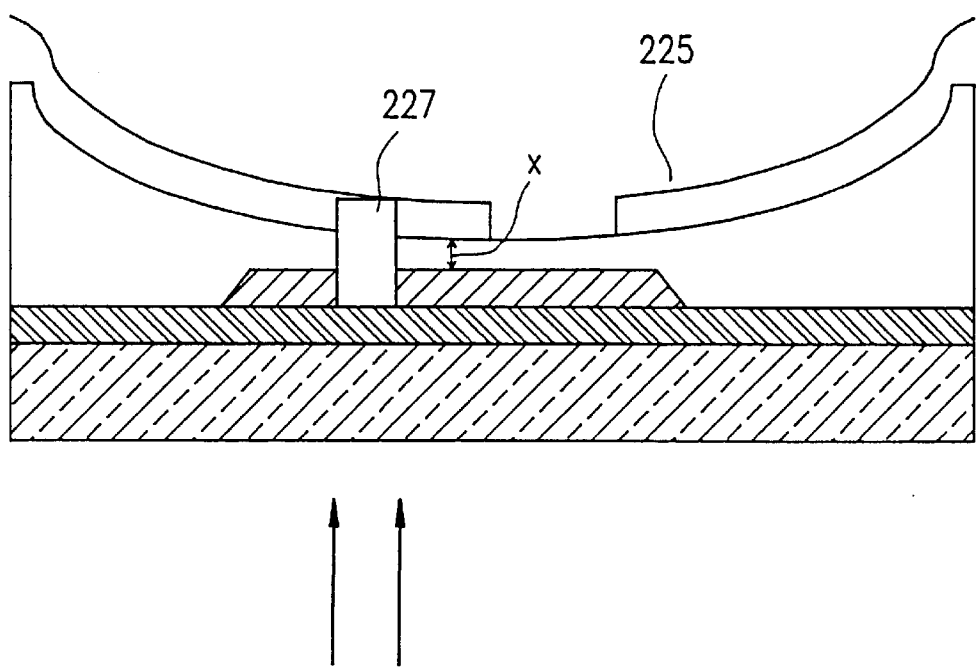
FIG. 14 is a sectional view for describing a method for repairing a defect in a display device according to the present invention.

As shown in FIG. 14, the overlap portion of the pixel electrode 224 and the connection projection 223 is irradiated with an energy beam such as a laser beam to penetrate the insulating film 212 in the overlap portion and thus to form a through hole 227. This electrically connects the pixel electrode 224 and the corresponding signal line 222 to allow all signals on the signal line 222 to be input into the pixel electrode 224. As a result, the defective pixel can exhibit a brightness which is an average brightness of all pixels connected to this signal line 222, thereby making the display defect less visually conspicuous.

Pixel defects are classified into two categories; (1) ON failures and (2) OFF failures. The (1) ON failure is a failure in charging a pixel sufficiently to effect pixel display within the write period of the TFT. The (2) OFF failure is a failure in holding a required amount of charge in a pixel during the holding period causing leakage. In the (2) OFF failure, the charges leak to (2-1) the scanning line, (2-2) the signal line, or (2-3) a counter electrode. In the case of (2-2) leakage to the signal scanning line, the charges leak to (2-2a) the signal line which supplies signals to the relevant pixel electrode or (2-2b) the signal line, which is adjacent to the pixel electrode, but does not supply signals to the pixel electrode.

The above-described method for repairing a defect in this Example is applicable to the (1) ON failure and (2-2a) OFF failure where charges leak to the signal line which supplies signals to the relevant pixel electrode. In the other cases (2-1), (2-2b), and (2-3), the above method may be inappropriate because signal mixing may arise by the laser irradiation thereby causing a line defect.

Hereinbelow, an active matrix substrate having TFTs made of amorphous Si will be described as an example.

The scanning lines 221 and the gate electrodes 230 as part of the scanning lines 221 of a single-layer or multilayer structure are formed on the transparent insulating substrate 210 made of glass or the like. The gate insulating film 211, made of $SiN_x$, $SiO_2$, $Ta_2O_5$, or the like, is formed on the insulating substrate 210 covering the scanning lines 221 and the gate electrodes 230. The semiconductor layers (not shown) made of i-Si are formed on the gate insulating film 211 so as to overlap the gate electrodes 230. A channel protection layer (not shown), made of $SiN_x$, $Ta_2O_5$, or the like, is then formed on the center portion of each semiconductor layer. Two $n^+$-Si layers (not shown), which serve as contact layers of the semiconductor layers with the source electrode 231 and the drain electrode 232 to be formed later, are formed so as to overlap the end portions of the channel protection layer and portions of the semiconductor layers and so that they are separated from each other on the channel protection layer.

The signal lines 222, the source electrodes 231 as branches of the signal lines 222, the connection projections 223, and the drain electrodes 232 of a single-layer or multilayer structure, which are all made of Ta, Al, Mo, W, Cr, or the like, are formed on the resultant substrate. Each source electrode 231 is formed on one of the contact layers, while each drain electrode 232 is formed on the other contact layer. The connection projections 223 extend from the signal lines 222 to the corresponding pixel electrodes 224. The insulating film 212 is formed covering the TFTs 204, the scanning lines 221, and the signal lines 222. The pixel electrodes 224, made of ITO, are formed on the insulating film 212. Each pixel electrode 224 overlaps the connection projection 223 extending from the corresponding signal line 222 via the insulating film 212, and is connected to the drain electrode 232 of the corresponding TFT 204 via the contact hole 226 formed through the insulating film 212. An alignment film (not shown) is formed on the pixel electrodes 224.

The active matrix substrate with the above configuration is laminated together with a counter substrate which includes a transparent insulating substrate and a black matrix, a color filter, a counter electrode, and an alignment film formed on the insulating substrate. A liquid crystal layer is interposed between the active matrix substrate and the counter substrate.

The active matrix liquid crystal panel of this example with the above-described active matrix substrate is fabricated in the following manner.

First, the fabrication of the active matrix substrate will be described.

The scanning lines 221, the gate electrodes 230, the gate insulating film 211, the semiconductor layers, the channel protection layers, and the contact layers are sequentially formed on the transparent insulating substrate 210 made of glass or the like.

Thereafter, Ta is deposited by sputtering to form a metal film, which is patterned by dry etching to form the signal lines 222, the source electrodes 231, the drain electrodes 232, and the connection projections 223.

A photosensitive acrylic resin is applied to a thickness of 3 μm on the resultant substrate where the scanning lines 221, the signal lines 222, and the TFTs 204 are formed, and then exposed to light according to a predetermined pattern. Specifically, the photosensitive acrylic resin is first exposed to light for 5000 to 7000 ms using a photomask with a pattern for the contact holes 226. Then, the photosensitive acrylic resin is exposed to light for 2000 to 4000 ms using a photomask with a pattern for the regions 225. The resultant resin is developed with an alkaline solution, etching the portions exposed to light. As a result, the portions which have been exposed to light for a longer time have been completely etched away, forming through holes as the contact holes 226, while the portions which have been exposed to light for a shorter time have been partially etched and form the regions 225 with a reduced thickness of about 0.3 μm.

The acrylic resin is then baked and cured. A transparent conductive film made of ITO with a thickness of 1000 Å is then formed on the cured resin by sputtering and is patterned to form the pixel electrodes 224. The pixel electrodes 224 are formed so that the peripheries thereof overlap the scanning lines 221 and the signal lines 222, to obtain the POP structure. Thus, each pixel electrode 224 overlaps the entire area of the connection projection 223, and is connected to the drain electrode 232 of the corresponding TFT 204 via the contact hole 226 formed through the insulating film 212. In the regions 225, since the insulating film 212 is not completely etched away, though it is thinned, the signal lines 222 and the pixel electrodes 224 are not electrically connected.

The alignment film is then formed and rubbed, to complete the active matrix substrate.

The counter substrate is formed in the following manner. The black matrix and a color filter of three colors are sequentially formed on the transparent insulating substrate and patterned. Then, ITO is deposited on the resultant substrate by sputtering and patterned to a predetermined shape to form the counter electrode. The alignment film is then formed and rubbed, to complete the counter substrate.

The thus-fabricated active matrix substrate and counter substrate are then laminated together, and liquid crystal is injected in a space between the two substrates and sealed. Thus, the liquid crystal panel is obtained.

The repair of a display defect arising in the liquid crystal panel will now be described.

Referring to FIG. 14, the overlap portion of the pixel electrode 224 and the connection projection 223 of a defective pixel is irradiated with an energy beam such as a laser beam. In this example, an infrared YAG laser was used. By this irradiation, the insulating film 212 in the overlap portion of the pixel electrode 224 and the connection projection 223 is penetrated by forming the through hole 227 for electrically connecting the pixel electrode 224 and the corresponding signal line 222. Thus, signals on the signal line 222 are directly supplied to the pixel electrode 224. That is, all signals applied to the signal line 222 during one frame are input into the pixel electrode 224. As a result, the defective pixel exhibits a brightness which is an average brightness of all pixels connected to the signal line 222, thereby making the display defect less conspicuous.

In this example, the pixel electrode and the corresponding signal line overlap by forming the connection projection extending from the signal line. Alternatively, the pixel electrode may have a connection projection, or both the pixel electrode and the signal line may have respective connection projections. The insulating film 212 may be made of an organic insulating material other than the photosensitive acrylic resin or an inorganic insulating material. For the switching elements, MIM elements, MOS transistors, diodes, or the like may be used. For the display medium, liquid crystal, EL, plasma, or the like may be used.

As described above, in the active matrix liquid crystal panel of this example, the overlap portion of a pixel electrode and the corresponding signal line is irradiated with an energy beam such as a laser beam, penetrating the insulating film in the overlap portion. This allows for an electrical connection between the pixel electrode and the corresponding signal line, thereby repairing the point defect on the display. Thus, production yield of the resultant display device is improved. Since the redundant structure required for the defect repair is only the overlap portion, the aperture ratio of the resultant display device does not decrease, and thus a bright display is obtained. As a result, display devices with good display characteristics can be fabricated with good yield at low cost.

EXAMPLE 9

An active matrix liquid crystal panel of Example 9 according to the present invention will be described with reference to FIGS. 15A and 15B.

Figure 15A:
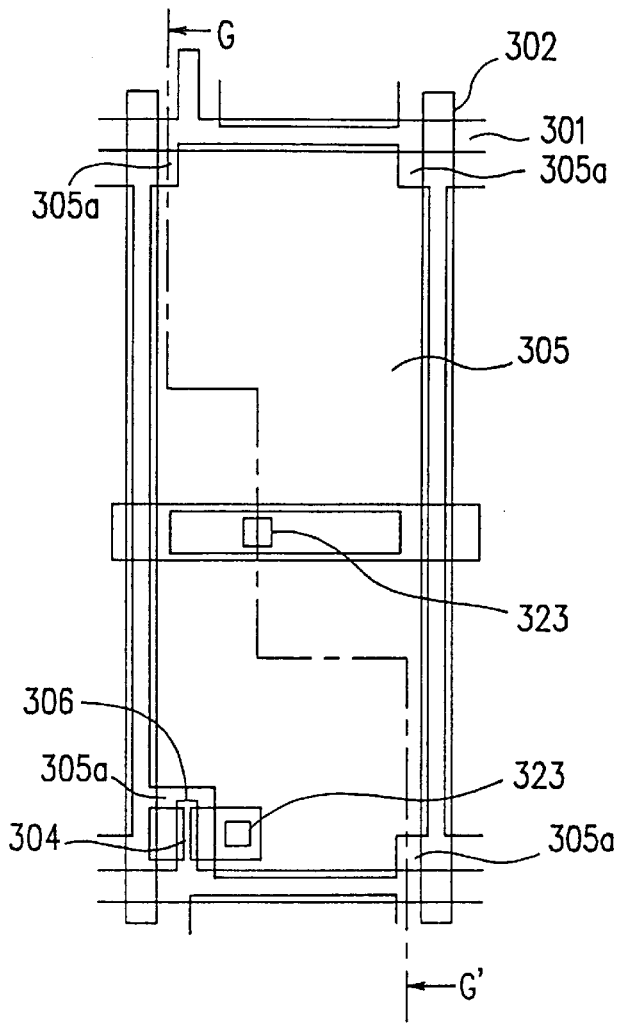
FIG. 15A is a plan view of one pixel of an active matrix liquid crystal panel of Example 9 according to the present invention.
Figure 15B:
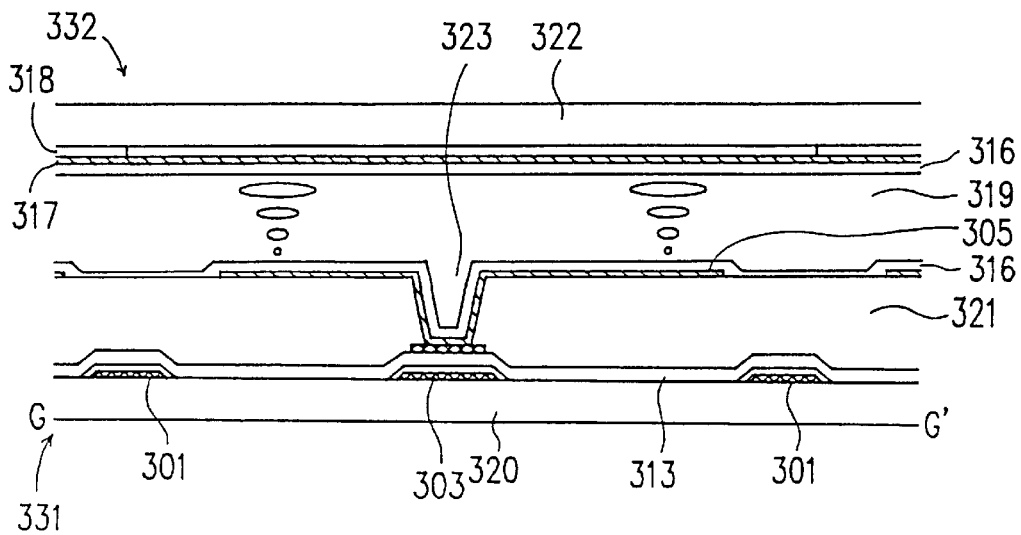
FIG. 15B is a sectional view taken along line G–G' of FIG. 15A.
Figure 17:
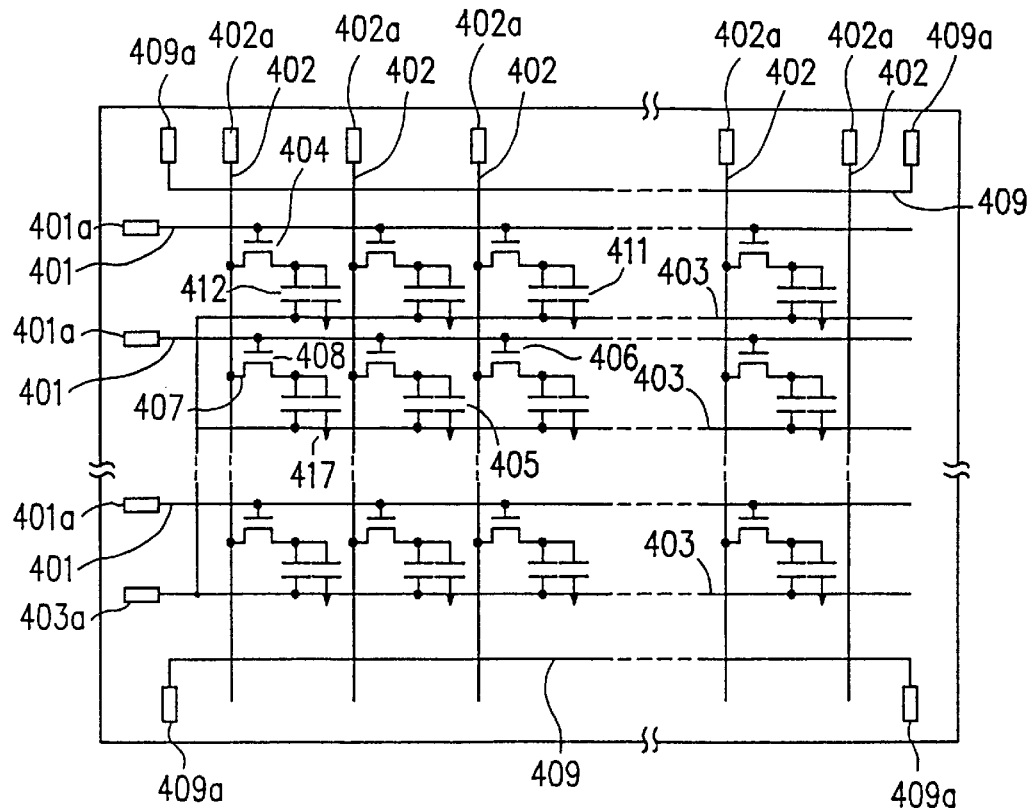
FIG. 17 is an equivalent circuit diagram of an active matrix substrate.
Figure 18:
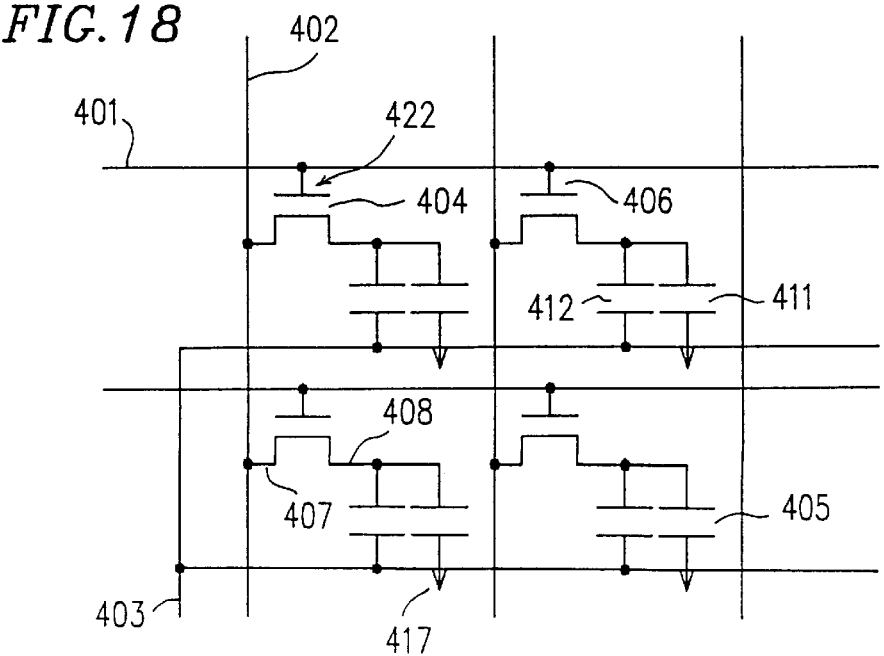
FIG. 18 is a partial enlarged view of the active matrix substrate of FIG. 17.
Figure 19:
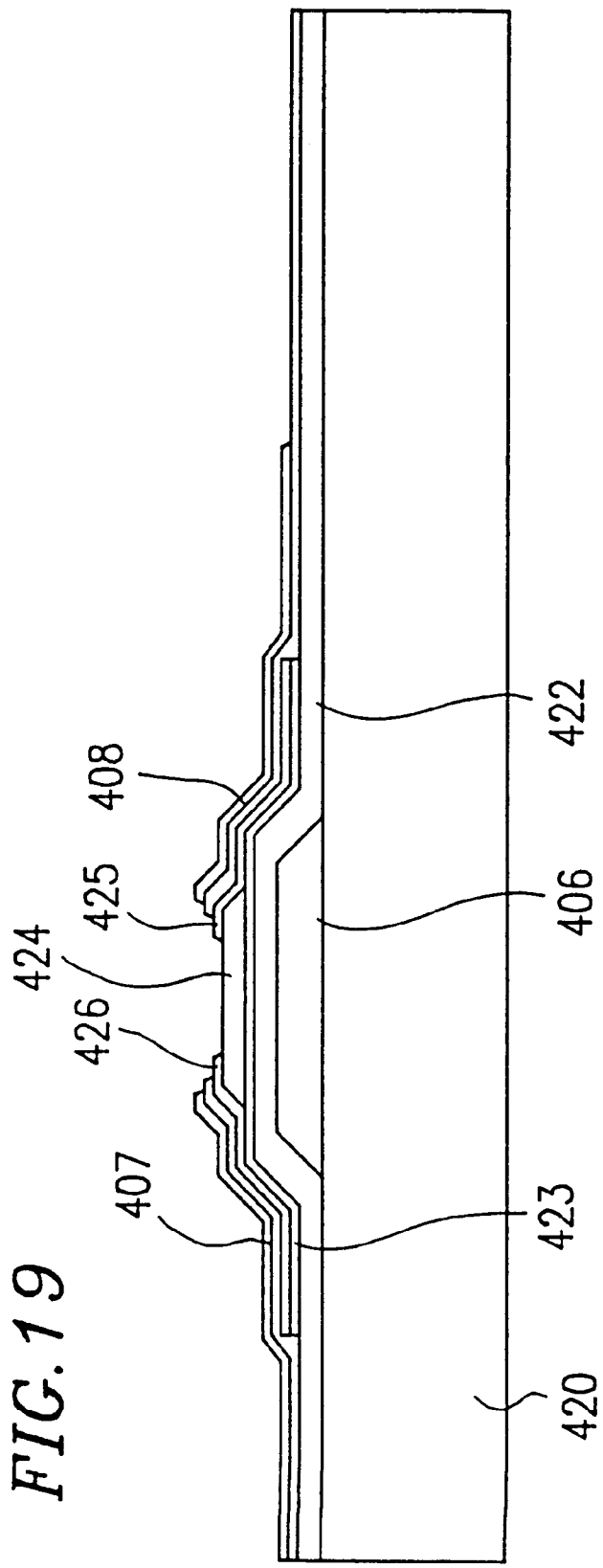
FIG. 19 is a sectional view of a TFT of the active matrix substrate of FIG. 17.
Figure 20:
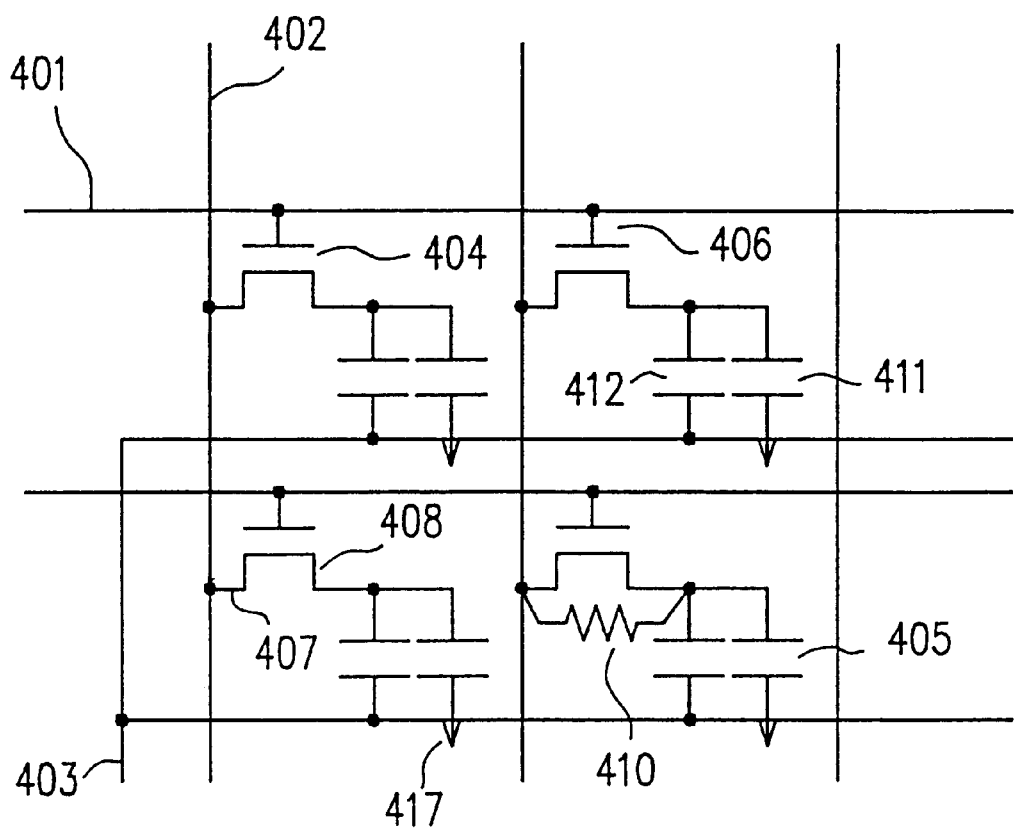
FIG. 20 is an equivalent circuit diagram of the active matrix substrate of FIG. 17 illustrating the case where a defect arises in a TFT.

FIG. 15A is a plan view of one pixel of the active matrix liquid crystal panel of this example. FIG. 15B is a sectional view taken along line G–G' of FIG. 15A. The equivalent circuit diagram of the liquid crystal panel of this example is the same as that shown in FIGS. 17 and 18.

The active matrix panel of this example includes an active matrix substrate 331 and a counter substrate 332 which face each other with a liquid crystal layer 319 interposed therebetween. The counter substrate 332 includes an insulating substrate 322 and a color filter 318, a counter electrode 317, and an alignment film 316 formed in this order on the surface of the insulating substrate 322 facing the liquid crystal layer 319.

The active matrix substrate 331 includes an insulating substrate 320 and scanning lines 301 and signal lines 302 formed on the insulating substrate 320 to cross each other. TFTs 304 are formed at the crossings of the scanning lines 301 and the signal lines 302 as switching elements. Branches 306 of the scanning lines 301 are used as the gate electrodes of the TFTs 304. The source electrodes of the TFTs 304 are directly connected to the corresponding signal lines 302, while the drain electrodes of the TFTs 304 are electrically connected to corresponding pixel electrodes 305. Such pixel electrodes 305 are formed on an insulating film 321 covering the scanning lines 301, the signal lines 302, and the TFTs 304. The pixel electrodes 305 are electrically connected to the drain electrodes of the TFTs 304 via corresponding through holes formed through the insulating film 321. Thus, the active matrix substrate 331 is of the pixel on passivation (POP) type structure.

Cut portions 305a are formed at the four corners of each pixel electrode 305 at the crossings of the adjacent scanning lines 301 and signal lines 302 so that the pixel electrode 305 does not overlap the adjacent signal lines 302 at these portions. Also, at least one redundant line (not shown), which can be short-circuited with the signal lines 302, is formed on each periphery of the area where the scanning lines 301 are formed in parallel with the scanning lines 301. Another alignment film 316 is formed on the surface of the resultant active matrix substrate 331 facing the liquid crystal layer 319.

In the active matrix liquid crystal panel with the above configuration, when the scanning line 301 and the signal line 302 are short-circuited, the exposed portions of the signal line 302 at the two cut portions 305a sandwiching the defect point due to the short circuit between the scanning line 301 and the signal line 302 are cut with a laser beam and the like. Furthermore, as in the conventional manner, the defective signal line 302 is connected to the redundant lines at the crossings thereof. A redundant line terminal of one of the redundant lines is connected to a redundant line terminal of the other redundant line via a jumper line (see FIG. 21). Thus, the defect due to the short circuit between the scanning line 301 and the signal line 302 can be repaired.

Thus, as described above, the POP-structure active matrix liquid crystal panel of this example has cut portions at four corners of each pixel electrode where the pixel electrode does not overlap the signal lines. Also, at least one redundant line which can be short-circuited with the signal lines is formed on each periphery of the area where the signal lines are formed in parallel with the scanning lines 301. In such a liquid crystal panel, when a defect arises due to a short circuit between the scanning line and the signal line, the portions of the signal line corresponding to the two cut portions sandwiching the defect point due to the short circuit between the scanning line and the signal line are cut. Simultaneously, the end portions of the signal line and the redundant lines are short-circuited at the crossings thereof. In this way, the defect due to the short circuit between the scanning line and the signal line can be repaired, thereby improving the production yield in the fabrication of active matrix liquid crystal panels.

EXAMPLE 10

An active matrix liquid crystal panel of Example 10 according to the present invention will be described with reference to FIGS. 16A and 16B.

Figure 16A:
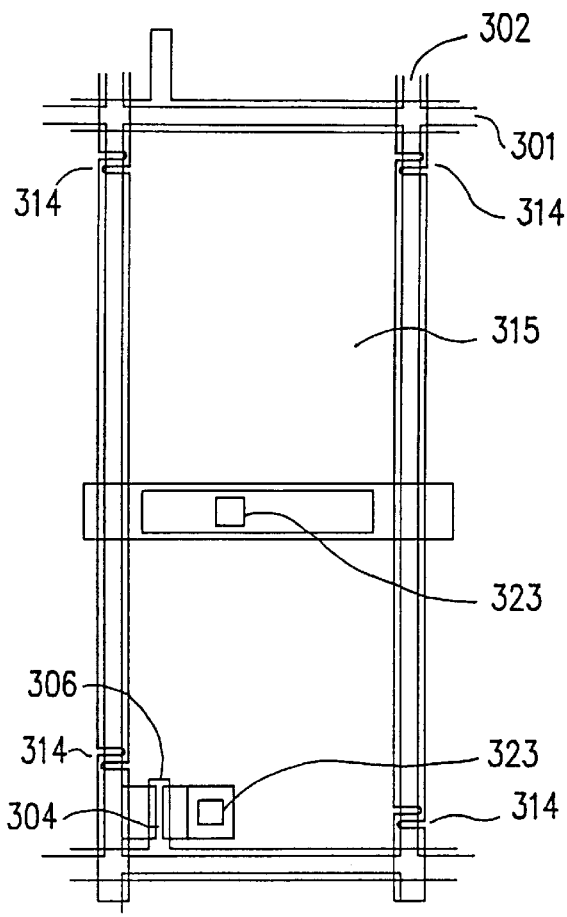
FIG. 16A is a plan view of one pixel of an active matrix liquid crystal panel of Example 10 according to the present invention.
Figure 16B:
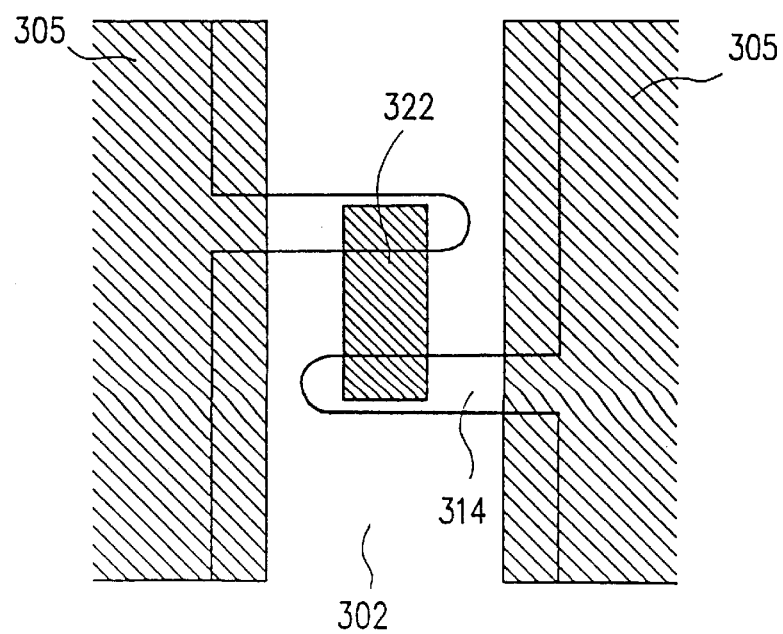
FIG. 16B is an enlarged plan view of a main portion of FIG. 16A.

FIG. 16A is a plan view of one pixel of the active matrix liquid crystal panel of this example. FIG. 16B is an enlarged view of a main portion of FIG. 16A. The same components as those shown in FIGS. 15A to 15B are denoted by the same reference numerals, and the description thereof is omitted. The equivalent circuit diagram of the liquid crystal panel of this example is the same as that shown in FIGS. 17 and 18.

The active matrix liquid crystal panel of this example adopts the POP structure as in the active matrix liquid crystal panel of Example 9. Cuttable portions 314 are formed at two positions of the signal line 302 and are close to the ends of each pixel electrode 305, i.e., close to the crossings of the signal line 302 with the scanning lines 301. The cuttable portions 314 are not be overlapped by the pixel electrode, and are narrower than the other portion of the signal line 302. At least one redundant line (not shown), which can be short-circuited with the signal lines, is formed on each periphery of the area where the signal lines are formed in parallel with the signal lines 302.

In the active matrix liquid crystal panel with the above configuration, when the scanning line 301 and the signal line 302 are short-circuited, the cuttable portions 314 sandwiching a defect point due to the short circuit between the scanning line 301 and the signal line 302 are cut with a laser beam or the like. The reference numeral 322 in FIG. 16B illustrates the cut portion by the laser irradiation. Furthermore, as in the conventional manner, the signal line 302 is connected to the redundant lines at the crossings thereof. A redundant line terminal of one of the redundant lines is connected to a redundant line terminal of the other redundant line via a jumper line (see FIG. 21). Thus, the defect due to the short circuit between the scanning line 301 and the signal line 302 can be repaired.

In Examples 9 and 10, the signal lines 302 to be cut with a laser beam need to be made of a material cuttable with a laser beam. Examples of materials satisfying this condition are Al, Ti, Ta, and Cu in consideration of the intrinsic electrical conductivity of the signal lines. Various laser beams may be used.

Thus, as described above, the POP-structure active matrix liquid crystal panel of this example has cuttable portions formed at two positions of each signal line which are close to the crossings of the signal line with the scanning lines so that they are not overlapped by the pixel electrode. Also, at least one redundant line, which can be short-circuited with each signal line, is formed on each periphery of the area where the signal lines are formed in parallel with the signal lines. In such a liquid crystal panel, when a short circuit arises between a scanning line and the signal line, the cuttable portions sandwiching a defect point due to the short circuit between the scanning line and the signal line are cut. Simultaneously, the end portions of the signal line and the redundant lines are short-circuited at the crossings thereof. In this way, the defect due to the short circuit between the scanning line and the signal line can be prevented. This improves the production yield in the fabrication of active matrix liquid crystal panels, thus preventing defective liquid crystal panels from being delivered to the market. That is, the quality and reliability of the liquid crystal panels are improved.

In the above examples, the irradiation of an energy beam such as a laser beam is conducted from the side of the insulating substrate of the active matrix substrate. However, the irradiation can be conducted from the opposite side of the insulating substrate of the active matrix substrate. In this case, conductive material is caused to be melted as mentioned in the above examples, resulting in repairing the defect.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. An active matrix liquid crystal panel comprising:

a plurality of scanning lines and a plurality of signal lines arranged to cross each other;

a plurality of pixel electrodes arranged in respective regions defined by the plurality of scanning lines and the plurality of signal lines; and a plurality of switching elements for driving the plurality of pixel electrodes, wherein each of the plurality of pixel electrodes overlaps at least one of adjacent scanning lines and adjacent signal lines among the plurality of scanning lines and the plurality of signal lines via an insulating film, and at least one of the plurality of pixel electrodes is electrically connected through the insulating film with the overlapped line at two locations on the overlapped line and said two locations bridge a break in the line.

2. An active matrix liquid crystal display panel according to claim 1, wherein a conductive metal layer is formed on or under each of the plurality of pixel electrodes.

3. A method for repairing a defect in an active matrix liquid crystal panel, the active matrix liquid crystal panel comprising:

a plurality of scanning lines and a plurality of signal lines arranged to cross each other;

a plurality of pixel electrodes arranged in respective regions defined by the plurality of scanning lines and the plurality of signal lines;

a plurality of switching elements for driving the plurality of pixel electrodes, wherein each of the plurality of pixel electrodes overlaps at least one of adjacent scanning lines and adjacent signal lines among the plurality of scanning lines and the plurality of signal lines via an insulating layer and, electrically connecting an overlapped line and a pixel electrode overlapping the line when a disconnection arises at the overlapped line by irradiating with an energy beam two positions on the overlapped line where said two positions bridge the disconnection.

4. A method according to claim 3, wherein a conductive metal layer is formed on or under the plurality of pixel electrodes, and in the step of electrically connecting the overlapped line and the corresponding pixel electrode, the conductive metal layer is melted to connect the overlapped line and the corresponding pixel electrode.

5. An active matrix liquid crystal panel comprising:

scanning lines and signal lines arranged to cross each other;

a plurality of pixel electrodes arranged in respective regions defined by the scanning lines and the signal lines; and switching elements for driving the respective pixel electrodes, wherein the scanning lines, the signal lines, and the switching elements are isolated from the pixel electrodes via an insulating film, and each of the pixel electrodes is electrically connected with a drain electrode of a corresponding switching element via a contact hole formed through the insulating film, and said signal lines having one or more pads where each pad extends under one of the plurality of pixel electrodes.

6. A method for repairing a defect in an active matrix liquid crystal panel according to claim 5, wherein, when a switching element becomes a defective switching element, the one or more pads extending from a signal line corresponding to the defective switching element are irradiated with an energy beam to electrically connect the signal line and a corresponding pixel electrode overlapping the signal line.

7. An active matrix liquid crystal panel according to claim 5, wherein the one or more pads are formed proximate to ends of each of the pixel electrodes.

8. A method for repairing a defect in an active matrix liquid crystal panel according to claim 5, wherein, when one of the signal lines has a disconnection, the one or more pads are irradiated with an energy beam to electrically connect the disconnected signal line.

9. An active matrix liquid crystal panel according to claim 5, wherein the insulating film comprises a photosensitive acrylic resin.

10. An active matrix liquid crystal panel comprising:

scanning lines and signal lines arranged to cross each other;

a plurality of pixel electrodes arranged in respective regions defined by the scanning lines and the signal lines;

switching elements for driving the respective pixel electrodes, wherein the scanning lines, the signal lines, and the switching elements are isolated from the pixel electrodes via an insulating film, and each of the pixel electrodes is electrically connected with a drain electrode of a corresponding switching element via a through hole formed through the insulating film, and one or more pads are formed under each of the plurality of pixel electrodes and extend from a corresponding signal line, wherein the thickness of a portion of the insulating film where each of the pixel electrodes overlaps the one or more pads extending from the corresponding signal line is more than 2000 Å and less than 5000 Å.

11. An active matrix liquid crystal panel comprising:

scanning lines and signal lines arranged to cross each other;

a plurality of pixel electrodes arranged in respective regions defined by the scanning lines and the signal lines;

switching elements for driving the respective pixel electrodes, wherein the scanning lines the signal lines, and the switching elements are isolated from the pixel electrodes via an insulating film, and each of the pixel electrodes is electrically connected with a drain electrode of a corresponding switching element via a hole formed through the insulating film, and one or more pads are formed under each of the plurality of pixel electrodes and extend from a corresponding signal line, wherein the area of a portion where each of the pixel electrodes overlaps the one or more pads extending from the corresponding signal line is more than 50 $\mu m^2$ and less than 100 $\mu m^2$.

* * * * *